United States Patent
Chhabda et al.

(10) Patent No.: US 11,461,040 B2
(45) Date of Patent: Oct. 4, 2022

(54) ASYNCHRONOUS WRITE REQUEST MANAGEMENT

(71) Applicants: Atlassian PTY Ltd., Sydney (AU); Atlassian, Inc., San Francisco, CA (US)

(72) Inventors: Jeevjyot Singh Chhabda, Mountain View, CA (US); Mikhael Tanutama, Fremont, CA (US)

(73) Assignees: Atlassian PTY Ltd., Sydney (AU); Atlassian, Inc., San Francisco, CA (US)

( * ) Notice: Subject to any disclaimer, the term of this patent is extended or adjusted under 35 U.S.C. 154(b) by 64 days.

(21) Appl. No.: 17/031,170

(22) Filed: Sep. 24, 2020

(65) Prior Publication Data

US 2022/0091777 A1 Mar. 24, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–28; G06F 11/30–3696; G06F 12/00–16; G06F 13/00–4295; G06F 15/00–825; G06F 16/00–489; G06F 16/50–787; G06F 16/80–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004;
(Continued)

(56) References Cited

U.S. PATENT DOCUMENTS

| 10,423,573 B1 * | 9/2019 | Shaw ..................... G06F 3/0665 |
| 2004/0125782 A1 * | 7/2004 | Chang ................... G06F 3/0656 370/338 |

(Continued)

OTHER PUBLICATIONS

The Cache Memory Book Second Edition; Jim Handy; ISBN 0-12-322980-4; 1998 (Year: 1998).*
(Continued)

*Primary Examiner* — Daniel C. Chappell
(74) *Attorney, Agent, or Firm* — Alston & Bird LLP

(57) ABSTRACT

Systems and methods provide techniques for more effective read/write management in collaborative data interaction frameworks. In response, embodiments of the present invention provide methods, apparatuses, systems, computing devices, and/or the like that are configured to enable effective and efficient read/write management in collaborative data interaction frameworks. For example, certain embodiments of the present invention provide methods, apparatuses, systems, computing devices, and/or the like that are configured to read/write management in collaborative data interaction frameworks using techniques that utilize asynchronous write request management along with partially decoupled read request management.

24 Claims, 16 Drawing Sheets

(58) Field of Classification Search
CPC ........ G06F 2216/00–17; G06F 2221/00–2153;
G06K 9/00–6298; G06N 3/00–126; G06N
5/00–048; G06N 7/00–08; G06N 10/00;
G06N 20/00–20; G06N 99/00–007; G11B
20/00–10518; G11B 20/10527–1261;
G11B 20/1262–16; G11B 20/18–24;
G11B 33/00–1493; G11C 7/00–24; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 27/00–3293; H01L
2225/00–1094; H04L 9/00–38; H04L
12/00–40136; H04L 12/40143–66; H04L
41/00–5096; H04L 49/00–9094; H04L
61/00–6095; H04L 67/00–42
See application file for complete search history.

(56) References Cited

U.S. PATENT DOCUMENTS

| | | | | |
|---|---|---|---|---|
| 2009/0156134 | A1* | 6/2009 | Regen | G06F 3/0605 455/73 |
| 2010/0169581 | A1* | 7/2010 | Sheaffer | G06F 9/467 710/52 |
| 2011/0161615 | A1* | 6/2011 | Odaira | G06F 12/0269 711/E12.002 |
| 2011/0167222 | A1* | 7/2011 | Lee | G06F 9/30087 711/E12.017 |
| 2011/0197029 | A1* | 8/2011 | Saha | G06F 12/0842 711/E12.001 |
| 2016/0359975 | A1* | 12/2016 | Battle | H04L 67/06 |
| 2018/0336210 | A1* | 11/2018 | Bourgeois | G06F 3/0604 |

OTHER PUBLICATIONS

Computer Organization and Architecture | Pipelining | Set 2 (Dependencies and Data Hazard); Oct. 20, 2017; retrieved from https://web.archive.org/web/20171020203113/http://www.cdn.geeksforgeeks.org/computer-organization-and-architecture-pipelining-set-2-dependencies-and-data-hazard/ (Year: 2017).*

Oracle Coherence Developer's Guide 13 Read-Through, Write-Through, Write-Behind, and Refresh-Ahead Caching; Dec. 3, 2018; retrieved from https://web.archive.org/web/20181203105926/https://docs.oracle.com/cd/E15357_01/coh.360/e15723/cache_rtwtwbra.htm (Year: 2018).*

H. Xia, T. Lu, B. Shao, X. Ding and N. Gu, "Hermes: On collaboration across heterogeneous collaborative editing services in the cloud," Proceedings of the 2014 IEEE 18th International Conference on Computer Supported Cooperative Work in Design (CSCWD), 2014, pp. 655-660 (Year: 2014).*

* cited by examiner

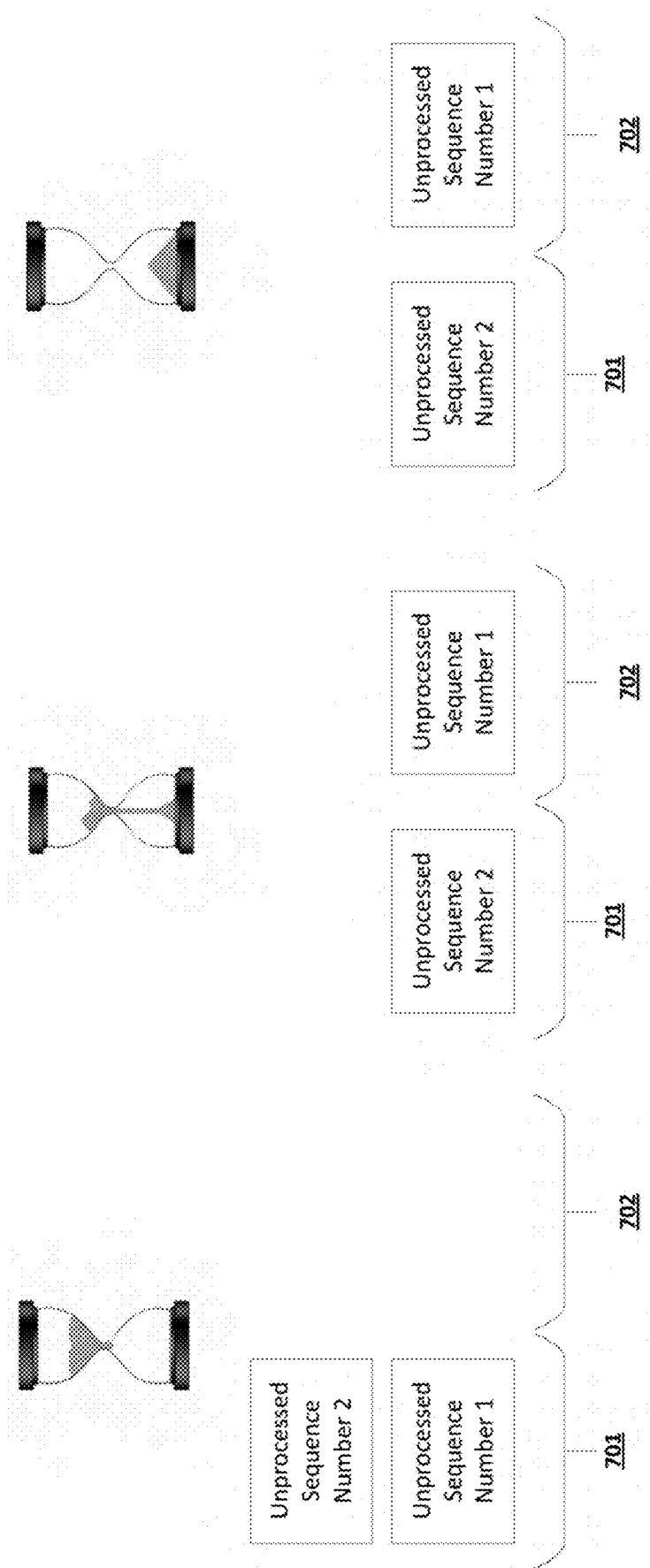

ASYNCHRONOUS WRITE REQUEST MANAGEMENT

BACKGROUND

Various methods, apparatuses, and systems are configured to provide techniques for read/write management in collaborative data interaction frameworks. Applicant has identified many deficiencies and problems associated with existing methods, apparatuses, and systems for read/write management in collaborative data interaction frameworks. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient read/write management in collaborative data interaction frameworks. For example, certain embodiments of the present invention provide methods, apparatuses, systems, computing devices, and/or the like that are configured to read/write management in collaborative data interaction frameworks using techniques that utilize asynchronous write request management along with partially decoupled read request management.

In accordance with one aspect, a computer-implemented method is provided. In one embodiment, the computer-implemented method comprises: receiving a read request for a data object identifier from a client computing device; in response to receiving the read request, determining a match status for the data object identifier based on an unprocessed write request ledger, wherein the match status describes an affirmative match status when the unprocessed write request ledger comprises one or more unprocessed sequence numbers that describe one or more unprocessed write requests for the data object identifier; in response to determining that the match status describes the affirmative match status, generating an update data object associated with the data object identifier based on a latest state of target data associated with the data object identifier as soon as one of a plurality of data retrieval conditions is satisfied, wherein the plurality of data retrieval conditions comprise a first data retrieval condition that is satisfied when all of the one or more unprocessed write requests are marked as processed and a second data retrieval condition that is satisfied when a waiting period is expired; and transmitting the update data object to the client computing device.

In accordance with another aspect, a computer program product is provided. The computer program product may comprise at least one computer-readable storage medium having computer-readable program code portions stored therein, the computer-readable program code portions comprising executable portions configured to: receive a read request for a data object identifier from a client computing device; in response to receiving the read request, determine a match status for the data object identifier based on an unprocessed write request ledger, wherein the match status describes an affirmative match status when the unprocessed write request ledger comprises one or more unprocessed sequence numbers that describe one or more unprocessed write requests for the data object identifier; in response to determining that the match status describes the affirmative match status, generate an update data object associated with the data object identifier based on a latest state of target data associated with the data object identifier as soon as one of a plurality of data retrieval conditions is satisfied, wherein the plurality of data retrieval conditions comprise a first data retrieval condition that is satisfied when all of the one or more unprocessed write requests are marked as processed and a second data retrieval condition that is satisfied when a waiting period is expired; and transmit the update data object to the client computing device.

In accordance with yet another aspect, an apparatus comprising at least one processor and at least one memory including computer program code is provided. In one embodiment, the at least one memory and the computer program code may be configured to, with the processor, cause the apparatus to: receive a read request for a data object identifier from a client computing device; in response to receiving the read request, determine a match status for the data object identifier based on an unprocessed write request ledger, wherein the match status describes an affirmative match status when the unprocessed write request ledger comprises one or more unprocessed sequence numbers that describe one or more unprocessed write requests for the data object identifier; in response to determining that the match status describes the affirmative match status, generate an update data object associated with the data object identifier based on a latest state of target data associated with the data object identifier as soon as one of a plurality of data retrieval conditions is satisfied, wherein the plurality of data retrieval conditions comprise a first data retrieval condition that is satisfied when all of the one or more unprocessed write requests are marked as processed and a second data retrieval condition that is satisfied when a waiting period is expired; and transmit the update data object to the client computing device.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 6A:
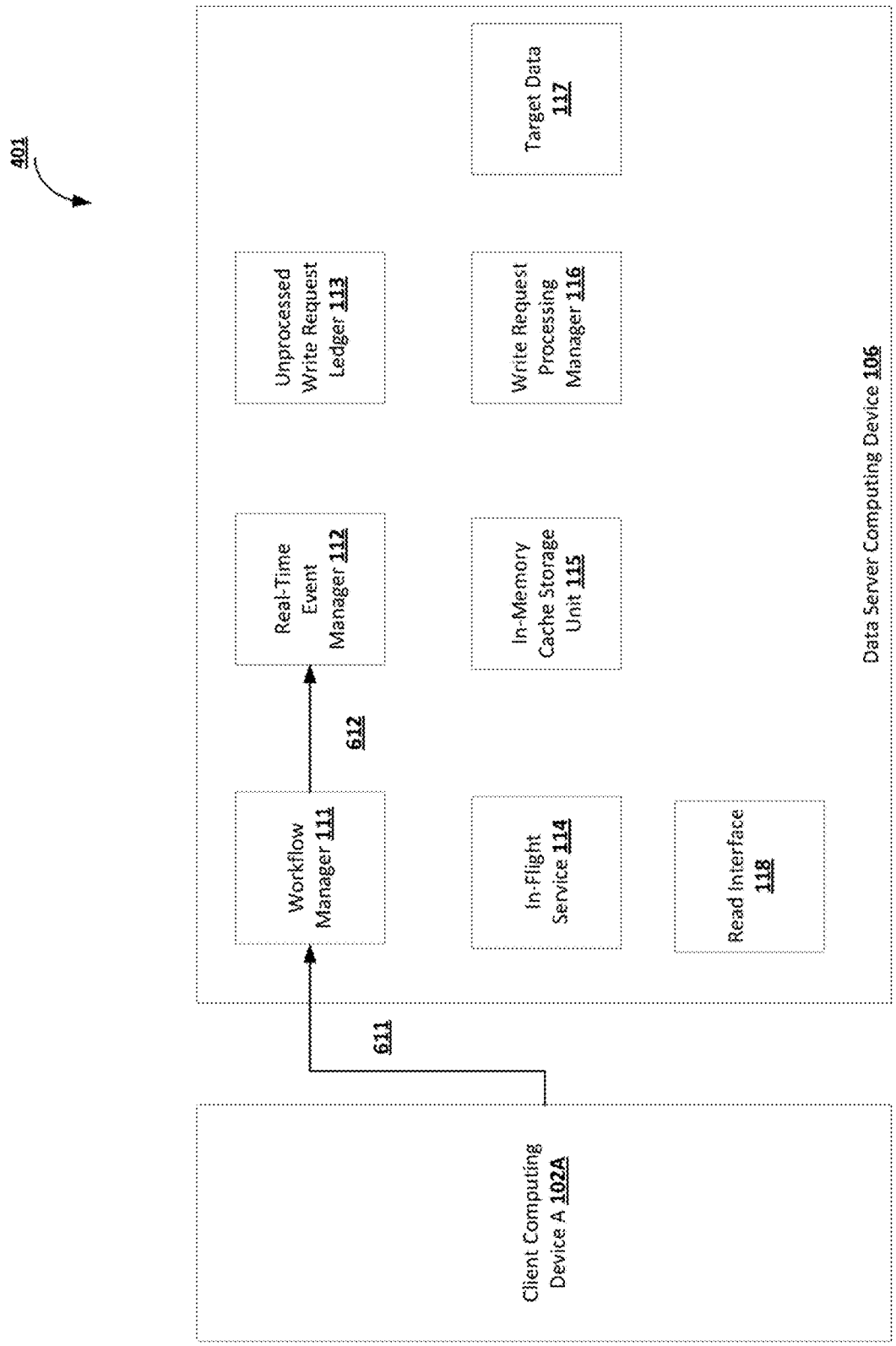

FIG. 6A provides an operational example of receiving a write request for a data object in accordance with at least some embodiments of the present invention.

Figure 6B:
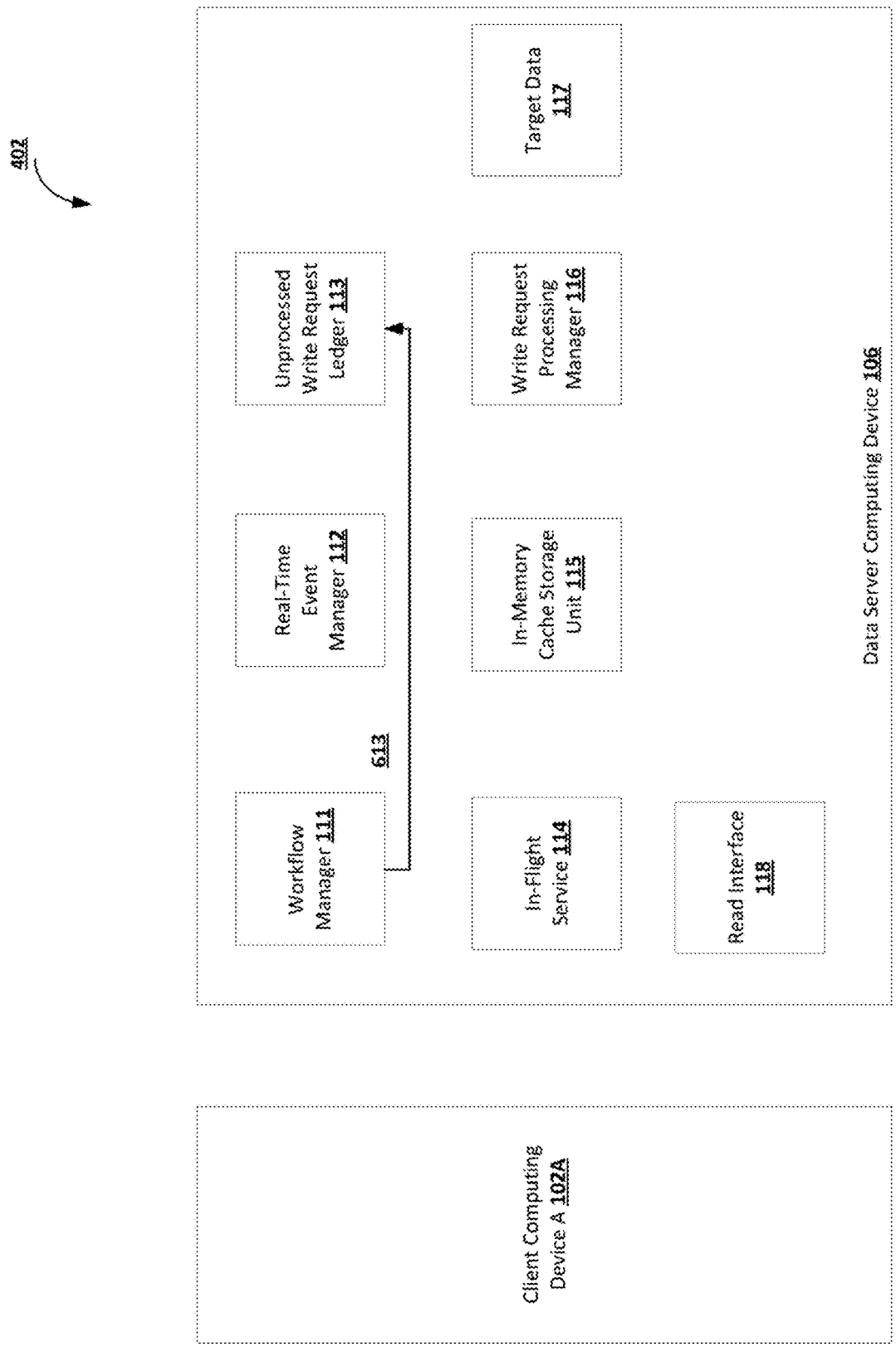

FIG. 6B provides an operational example of updating an unprocessed write request ledger based on a write request in accordance with at least some embodiments of the present invention.

Figure 6C:
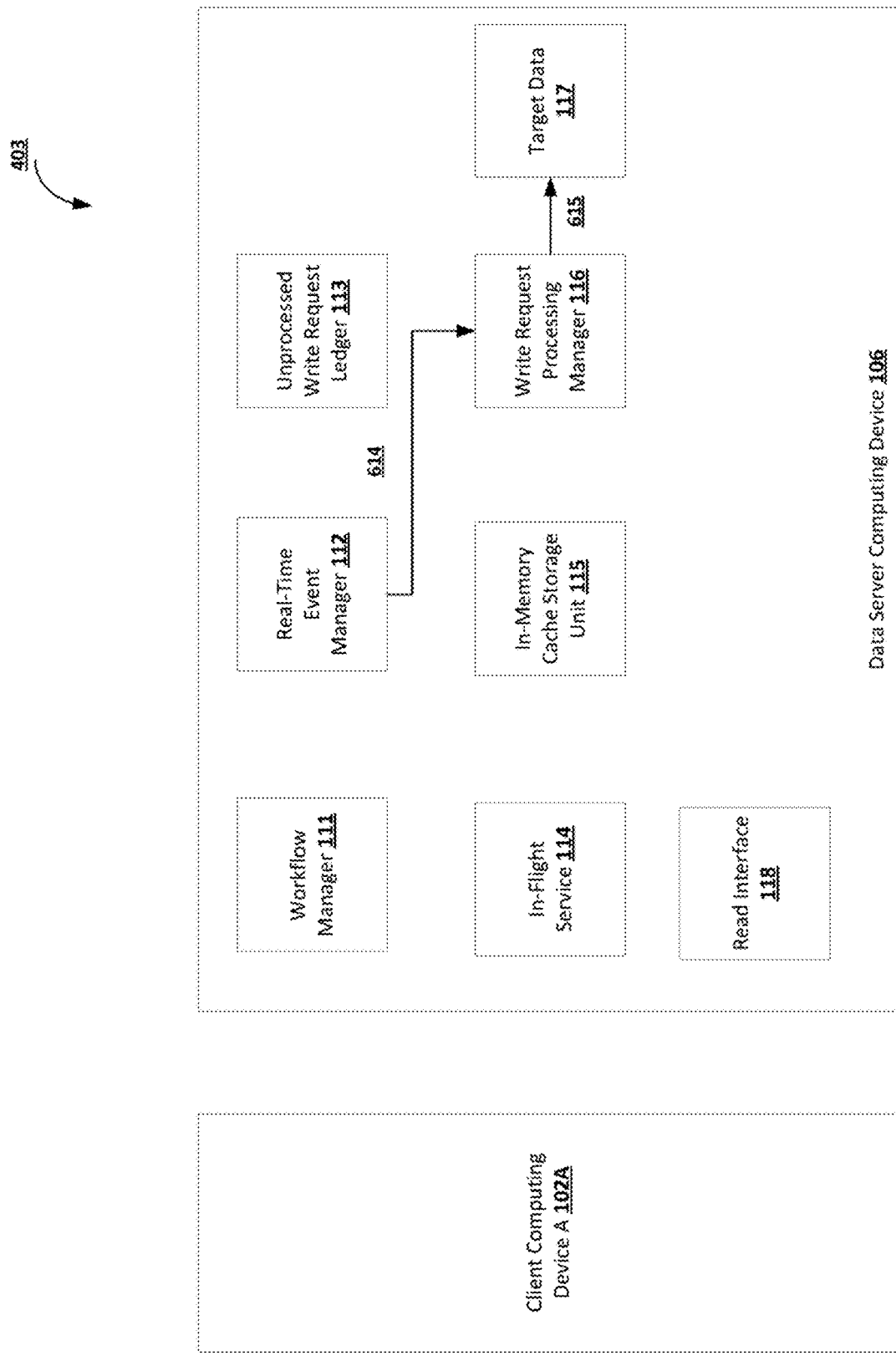

FIG. 6C provides an operational example of processing a write request in accordance with at least some embodiments of the present invention.

Figure 6D:
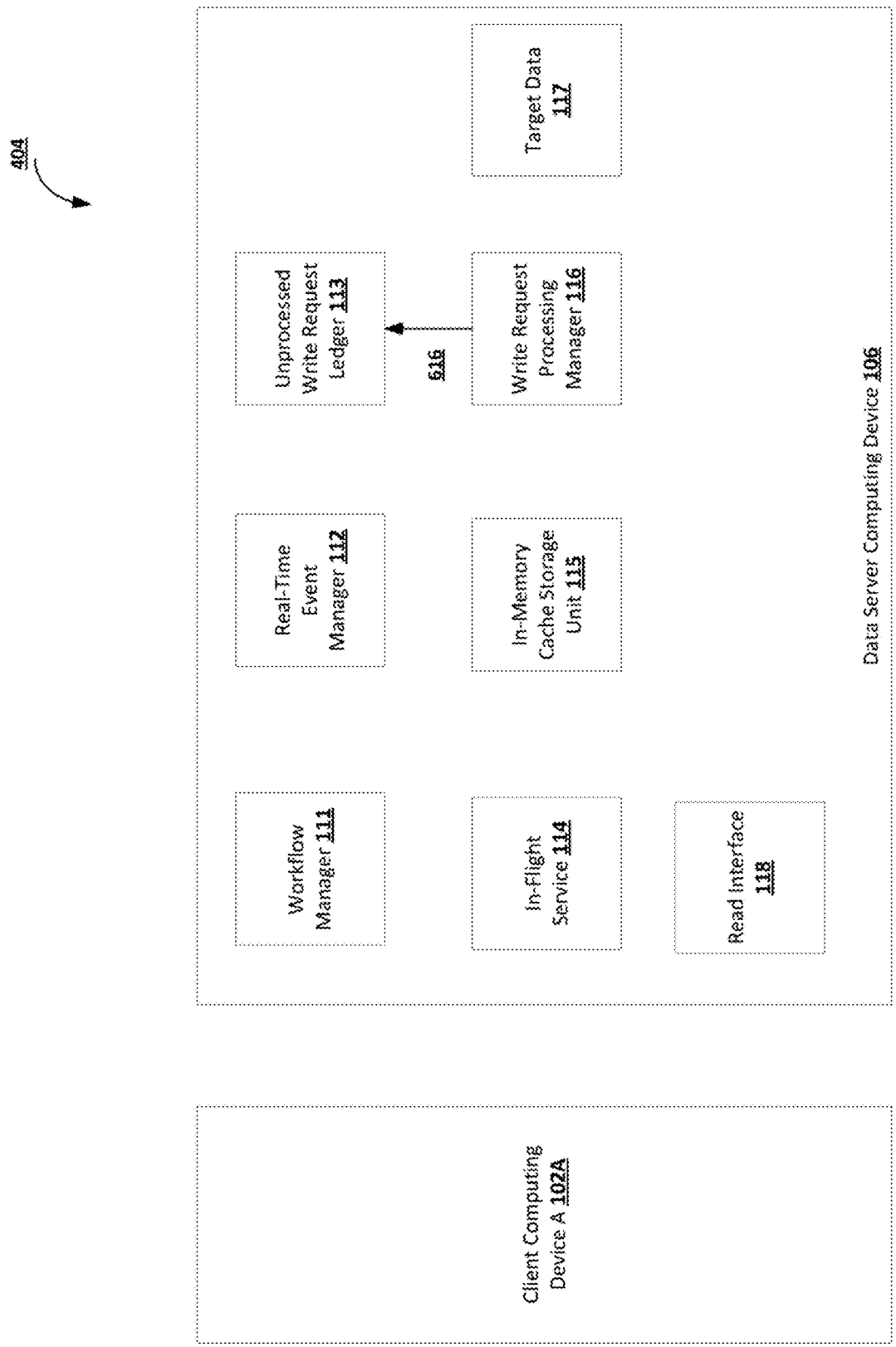

FIG. 6D provides an operational example of removing the unprocessed write request for a processed write request from an unprocessed write request ledger in accordance with at least some embodiments of the present invention.

Figure 6E:
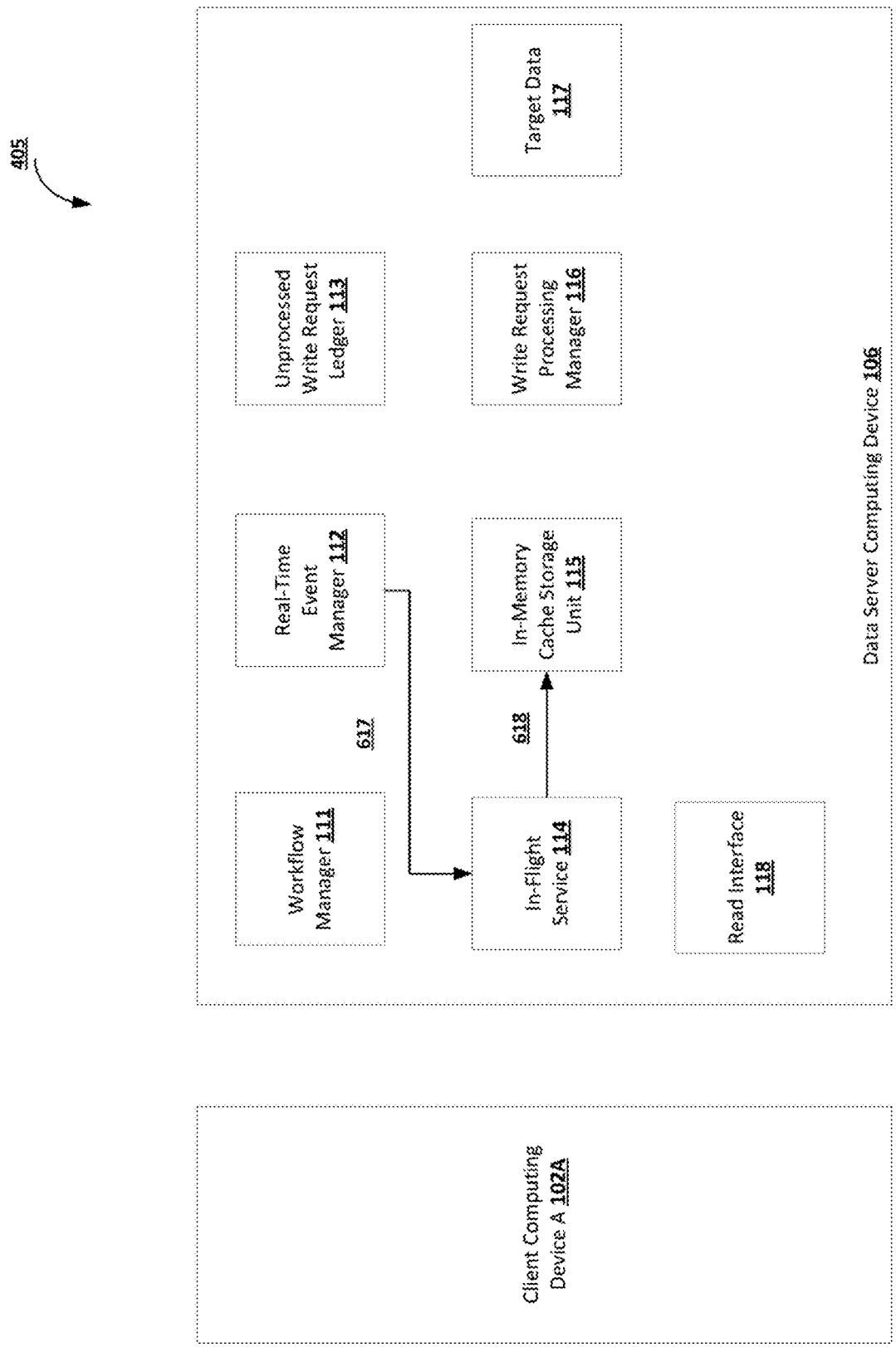

FIG. 6E provides an operational example of updating expedited retrieval data for a data object based on updated target data for the data object in accordance with at least some embodiments of the present invention.

Figure 6F:
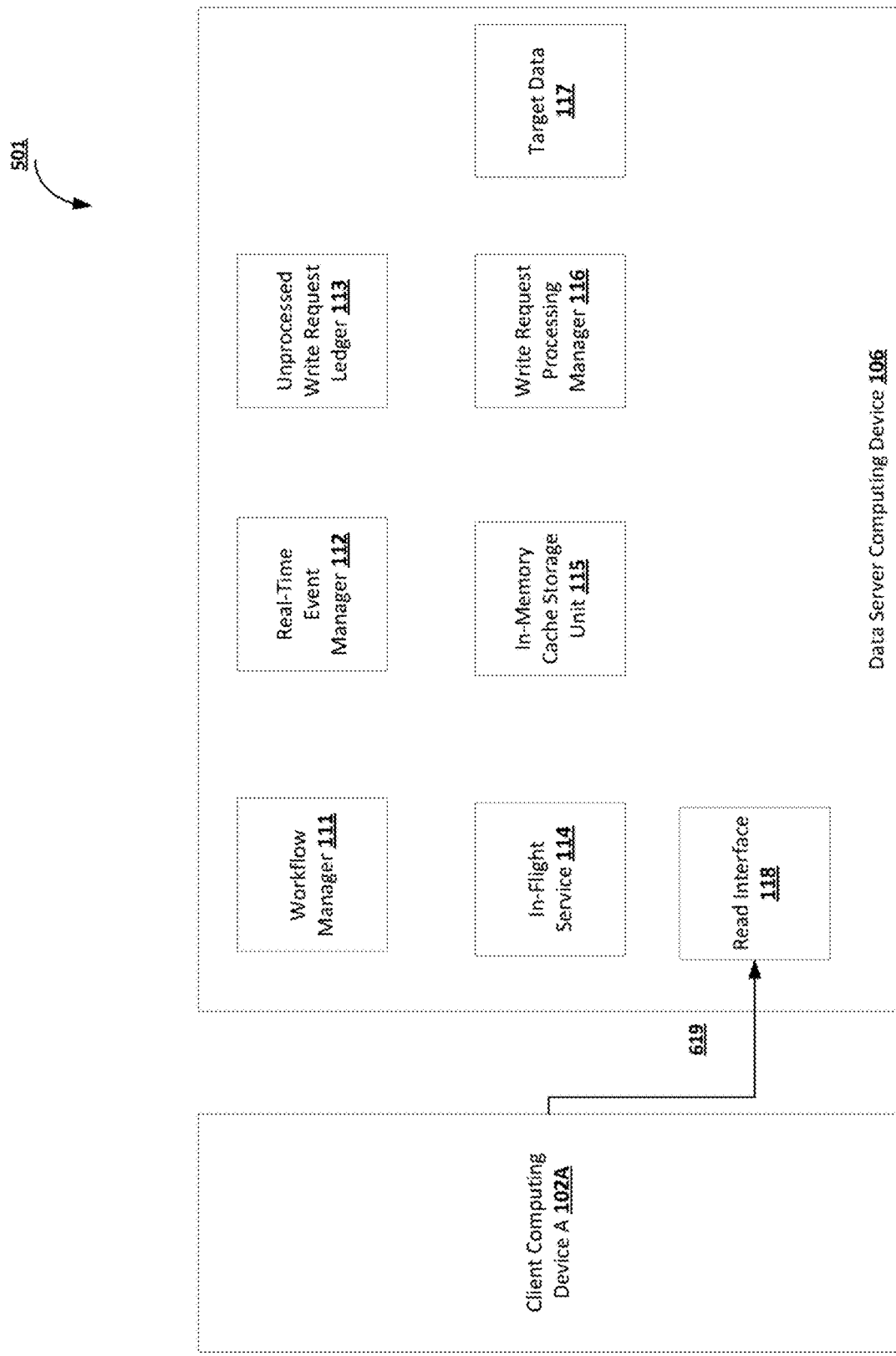

FIG. 6F provides an operational example of receiving a read request for a data object in accordance with at least some embodiments of the present invention.

Figure 6G:
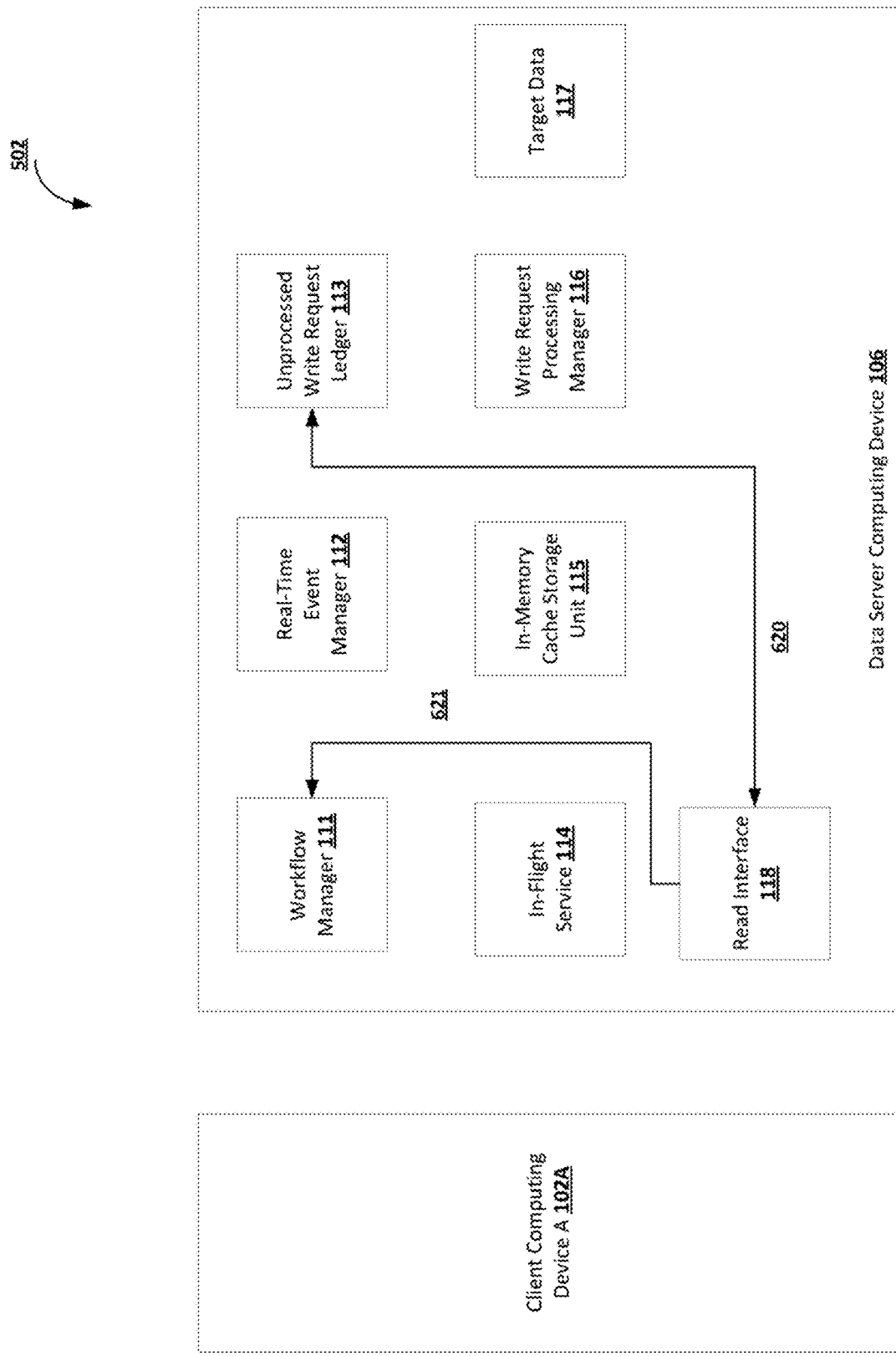

FIG. 6G provides an operational example of determining a match status for a data object based on an unprocessed write request ledger in accordance with at least some embodiments of the present invention.

Figure 6H:
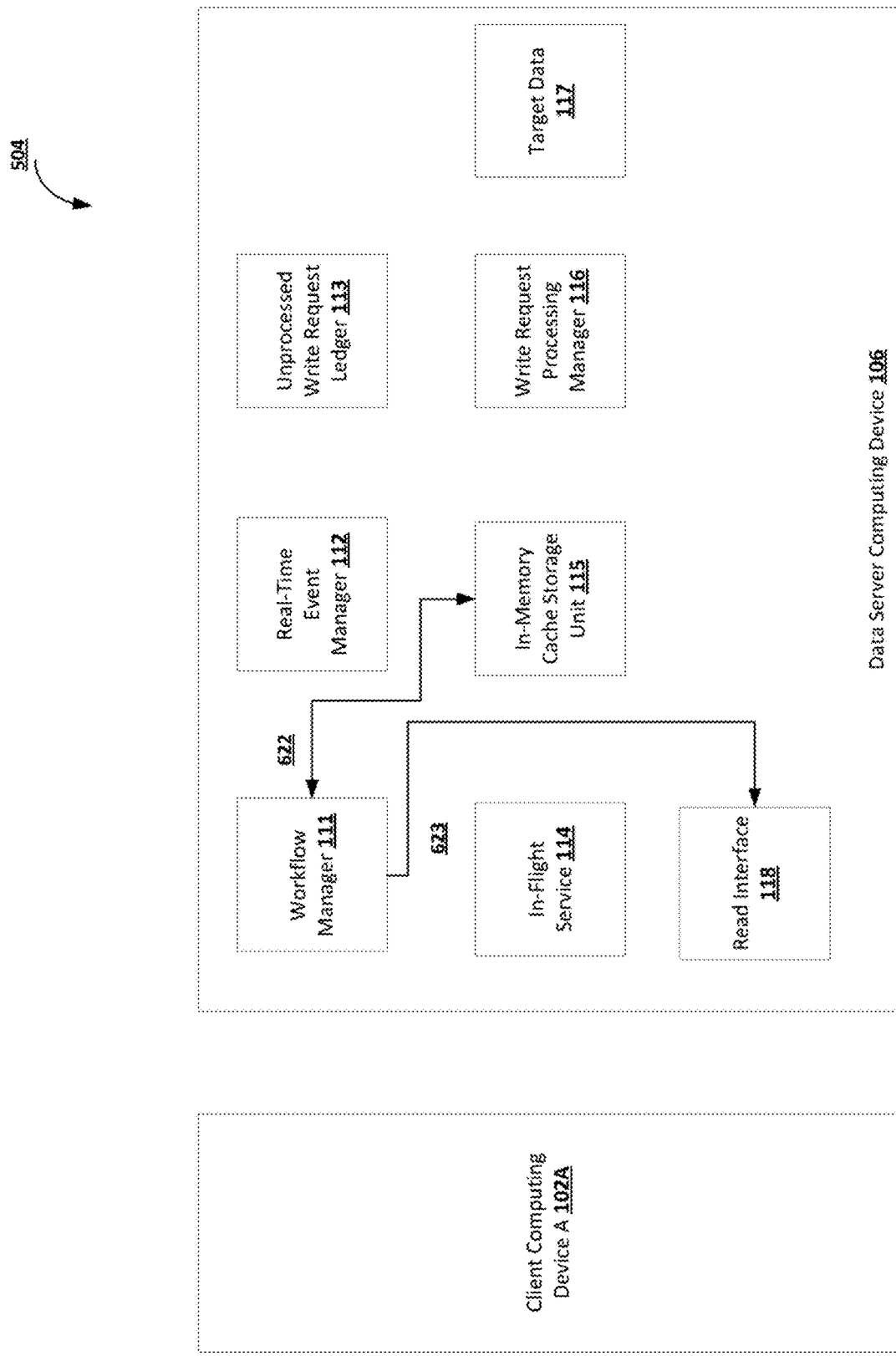

FIG. 6H provides an operational example of determining an update data object in response to a read request for a data object in accordance with at least some embodiments of the present invention.

Figure 6I:
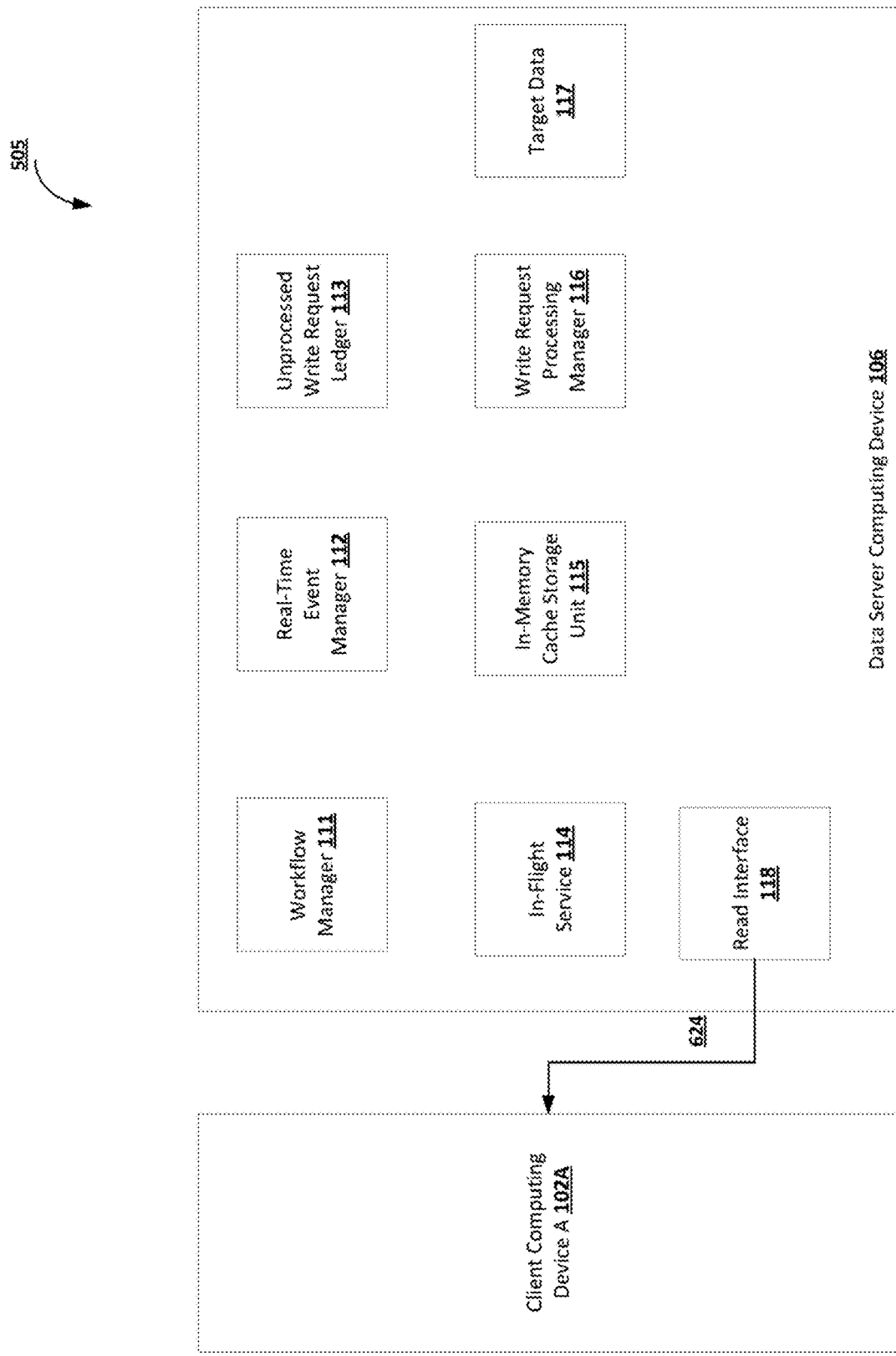

FIG. 6I provides an operational example of transmitting an update data object in response to a read request for a data object in accordance with at least some embodiments of the present invention.

FIGS. 7A-7C and 8A-8C provide operational examples of performing partially decoupled read request management in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with managing read and write requests in an environment that enables multiple users to collaboratively and substantially simultaneously both read and write data accessed by a data server computing device. An example of such an environment is a Confluence® knowledge management environment developed and owned by Atlassian PTY LTD, which enables multiple users to collaboratively and simultaneously edit (e.g., leave comments on) a page or page and view such page or page.

Managing read and write requests can be challenging in such a collaborative real-time environment. It is desirable but difficult to achieve for such a collaborative system to operate in a manner that increases the likelihood that read requests promptly return the most updated versions of shared data objects while also decreasing both write request processing latency (i.e., the time it takes for a write request to be processed) and read request processing latency (i.e., the time it takes for a read request to be processed, and the time for any response to the read request to be generated and returned to the client device).

To illustrate one aspect of this challenge, consider the following scenario. A first user, Tom, has created a first content data item describing updates to a new human resources policy. A second user, Jane, annotates the first content data item with a second content data item ("Looks good Tom") using her client device thereby generating a write request that is transmitted to a data server computing device at time $t_0$. At approximately the same time, a third user, Fred, annotates the page with a third content data item ("Tom let's also consider a HIPAA section") using his client device thereby generating a second write request that is transmitted to the data server computing device. At substantially the same time, a fourth user, Sally, attempts to load the first content data item using her client device thereby transmitting a read request to the data server computing device. The data server and computing device must be configured to process Jane's first write request and Fred's write request in order to provide Sally with the most up to date content data without introducing undue read latency.

To address the above-noted challenges concerning processing of temporally proximate write requests and read requests, various embodiments of the present invention disclose and implement two related concepts: asynchronous write request management and partially decoupled read request management. Asynchronous write request management means that write requests are processed through a procedure that is performed independent of and irrespective of any temporally proximate read requests. Partially decoupled read request management means that, when processing a read request for a data object that is associated with one or more unprocessed write requests, a computer system waits for the unprocessed write requests to be processed, but this waiting time cannot exceed a maximum waiting period that is selected to mitigate read latency concerns. Accordingly, in various embodiments, while processing a read request takes into account whether a corresponding data object is associated with unprocessed write requests prior to generating output data corresponding to the read request, this consideration is limited in duration in order to reduce read request processing latency.

By using asynchronous write request management and partially decoupled read request management, a computer system can process read requests for a data object identifier through a procedure that is partially decoupled from the procedure for processing write requests for the data object identifier, a technique that in turn can reduce read request processing latency without introducing data reliability risks imposed by a total decoupling of read request processing procedures and write request processing procedures. Accordingly, by introducing techniques for performing asynchronous write request management and partially decoupled read request management, various embodiments of the present invention make important technical contributions to improving efficiency and reliability of read/write management in collaborative data interaction systems and networks.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the data server computing device 106 of FIG. 1. In some embodiments, a server computing device communicates with one or more client computing devices using one or more computer networks.

The term "read request" describes a data entity generated by a client computing device and transmitted to a data server computing device by the client computing device, where the data entity describes a request by the client computing device to retrieve an update data object describing a latest state of target data associated with a corresponding data object identifier. The data entity is further configured to trigger operations by the data server computing device to generate the update data object and transmit the update data object to the client computing device. Examples of read requests include requests generated when a user profile requests to open a user interface that is configured to display target data associated with a data object identifier, requests generated when a user profile requests to refresh an already-opened user interface that is configured to display target data associated with a data object identifier, and requests generated when a client computing device seeks to automatically (e.g., periodically) refresh an already-opened user interface that is configured to display target data associated with a data object identifier. In some embodiments, the read request is generated by a client computing device and subsequently transmitted to a data server computing device in response to an end-user request by an end-user of the client computing device to refresh a page data object being hosted on a storage subsystem associated with the data server computing device. An example of a read request is the request triggered by Sally's action in the exemplary scenario described in the Overview section of the present document.

The term "write request" describes a data entity generated by a client computing device and transmitted to a data server computing device by the client computing device, where the data entity identifies a corresponding data object identifier. The write request describes a request by the client computing device to append write request data associated with the write request to target data associated with the corresponding data object identifier. The data entity is further configured to trigger operations by the data server computing device to persistently store the write request data as part of the target data. Examples of write requests include requests to add content to a page object identifier, requests to add annotations to a page object identifier, requests to add comments to a page object identifier, etc. In some embodiments, the write request is generated by a client computing device and subsequently transmitted to a data server computing device in response to an end-user request by an end-user of the client computing device to modify a page data object being hosted on a storage subsystem associated with the data server computing device. Examples of write requests include requests triggered by actions of Jane and Fred in the scenario described in the Overview section of the present document.

The term "unprocessed sequence number" describes a data entity generated by a data server computing device in response to receiving a write request for a data object identifier, where the data entity uniquely identifies the write request. The unprocessed sequence number is configured to be stored as part of an unprocessed write request ledger in a storage subsystem associated the data server computing device until the corresponding write request is processed. In some embodiments, given an unprocessed write request that is associated with a particular content data item that is added to a particular data object identifier, the unprocessed sequence number for the write request is stored as part of an unprocessed write request ledger for the data object identifier until the related data associated with the particular content data item is persistently stored as part of the related data associated with the data object identifier. The unprocessed sequence number for a particular write request may be a randomly-generated number, may be an incrementing sequence number, or may be a number that is generated by the data server computing device by incrementing the write request for a previously-received write request.

The term "target data" describes one or more data collections generated by a data server computing device and maintained in a storage subsystem associated with the data server computing device. The target data is generated based on processed write requests associated with a corresponding data object identifier. The target data is used by the data server computing device to generate update data objects in response to receiving read requests associated with the corresponding data object. In some embodiments, the target data associated with a data object identifier includes content target data that describes contents of the data object identifier (e.g., contents of a page object identifier, such as contents of comments appended to the page object identifier) and target metadata of the data object identifier (e.g., target metadata of a page object identifier, such as target metadata of comments appended to the page object identifier). In some embodiments, the content target data and the target metadata are stored in separate (e.g., distributed) data storage units. Examples of target data include data describing the content data created by Tom in the scenario described in the Overview section of the present document, as modified via processing the write requests generated as a result of Jane's actions and Fred's action.

The term "write request data" describes one or more portions of a write request that collectively describe features of one or more modifications to the corresponding data object identifier that is associated with the write request. The write request data is configured to be stored as part of the target data associated with the corresponding data object identifier. An example of a write request data is the data associated with a user-provided comment for a page object identifier. In some embodiments, write request data for a corresponding write request include write request content data associated with the corresponding write request and write request metadata associated with the corresponding write request. Examples of write request content data include data describing contents of a comment, while examples write request metadata include metadata features associated with a comment, such as data describing author of a comment, a posting time of a comment, etc. Examples of write request data include data associated with the first content data item, the second content data item, and the third content data item as described in the exemplary embodiment described in the Overview section of the present document.

The term "unprocessed write request" describes a write request whose corresponding write request data have not been persistently stored as part of the target data for a corresponding data object identifier. In contrast, the term "processed write request" describes a write request whose corresponding write request data have been persistently stored as part of the target data for a corresponding data object identifier. In some embodiments, when a data server computing device first receives a write request from a client computing device, the write request is deemed unprocessed until the data server computing device persistently stores the write request data associated with the write request as part of the target data for the corresponding data object identifier, after which the write request is deemed processed. In some embodiments, to identify unprocessed write requests associated with a data object identifier, a data server computing device stores identifiers for the unprocessed write requests (e.g., unprocessed sequence numbers for the unprocessed write requests) as part of an unprocessed write request ledger for the data object identifier. In some embodiments, to process an unprocessed write request, a data server computing device stores write request data associated with the unprocessed write request (e.g., write request content data associated with the write request and/or write request metadata associated with the write request) as part of the target data associated with a corresponding data object identifier. For example, with respect to the exemplary scenario described in the Overview section of the present document, when a write request corresponding to the second content data item or the third content data item is first received, the noted write request is deemed unprocessed until the write request data associated with the write request is integrated into the target data associated with the first content data item, at which point the write request is deemed processed.

The term "unprocessed write request ledger" describes a data entity that is generated by a data server computing device and stored as part of a storage subsystem associated with the data server computing device. The unprocessed write request ledger describes each unprocessed sequence number for an unprocessed write request that is associated with a corresponding data object identifier. The unprocessed write request ledger may, for example, be a queue data object that is updated in a first-in-first-out manner. An example of an unprocessed write request ledger is a data entity that identifies all incoming comments for a page object identifier whose corresponding comment data (e.g., whose corresponding comment content data and/or corresponding comment metadata) have not been persistently stored as part of the page data for the page object identifier. In some embodiments, in response to processing an unprocessed write request by storing the write request data associated with the write request as part of the target data for a corresponding data object identifier, the unprocessed write request ledger for the corresponding data object identifier is updated by removing the previously-unprocessed write request from the unprocessed write request ledger. For example, with respect to the exemplary scenario described in the Overview section of the present document, when a write request corresponding to the second content data item or the third content data item is deemed unprocessed, an unprocessed sequence number associated with the write request is deemed as part of the unprocessed write request ledger and in a portion (e.g., a queue) of the unprocessed write request ledger that is associated with the first content data item.

The term "update data object" describes a data entity that is generated by a data server computing device, where the data entity is transmitted by the data server computing device to a client computing device in response to receiving a read request for a corresponding data object identifier. The data server computing device is configured to describe one or more modifications to target data associated with the corresponding data object identifier and enable the client computing device to display the one or more modifications as part of a user interface configured to display the target data associated with the corresponding data object identifier. In some embodiments, the update data object for a corresponding data object identifier describes all of the available target data associated with the corresponding data object identifier. In some other embodiments, the update data object for a corresponding data object identifier comprises all of the modifications to the target data associated with the corresponding data object identifier that have not been described by previously-transmitted updated data objects that have been transmitted by the data server computing device to an applicable client computing device. For example, upon receiving a request to refresh a page object identifier, instead of transmitting an update data object that describes all of the data fields associated with the page object identifier, the data server computing device may transmit only the modifications to the page object identifier that have been recorded/processed since a previously-processed refreshing of the page object identifier. In some embodiments, an update data object for a corresponding data object identifier may be generated based on expediated retrieval data associated with the corresponding data object identifier that are stored on an in-memory cash storage framework of the data server computing device.

The term "set of data retrieval conditions" describes a data entity that is stored by a storage subsystem associated with a data server computing device as part of the configuration data for the data server computing device. The data retrieval conditions are a group of two or more conditions, where the configuration data further describes that satisfaction of one of (e.g., an earliest-satisfied one of) the two or more conditions is a sufficient prerequisite for generating an updated data object for a corresponding data object identifier based on a latest state of target data for the corresponding data object identifier that is available at the time of the satisfaction. For example, in some embodiments, the set of data retrieval conditions consist of two conditions: a first condition that is satisfied if one or more identified unprocessed write requests for a corresponding data object identifier are marked as processed and a second condition that is satisfied if a waiting period (e.g., a waiting period of 300 milliseconds after receiving a read request for the corresponding data object identifier from a client computing device) expires. Thus, in some embodiments, upon receiving a read request for a corresponding data object identifier that is associated with one or more unprocessed write requests and in response to determining an affirmative match status for the corresponding data object identifier, the data server computing device waits until the earlier of the expiration of a waiting period or processing of the one or more unprocessed write requests before generating the update data object based on the latest state of the target data associated with the corresponding data object identifier.

The term "expediated retrieval data" describes a data entity that is generated by a data server computing device based on a latest state of the target data associated with a corresponding data object identifier. The expediated retrieval data is stored as part of an in-memory cache storage unit for the data server computing device in order to facilitate expediated data retrieval of data associated with the corresponding data object identifier when responding to a read request associated with the corresponding data object identifier. The data entity is further used to generate an update data object for the corresponding data object identifier in response to the read requests associated with the corresponding data object identifier. The expediated retrieval data may at each time describe which write requests associated with a corresponding data object identifier have been processed. In some embodiments, the expediated retrieval data are graph-based data, such as data describing comments to a corresponding page object identifier as graph-based relationships (e.g., edges) of a central node associated with the corresponding page object identifier. In some of the noted embodiments, the read request associated with the corresponding page object identifier is a graph-based query, such as Graph Query Language (GraphQL) query. For example, with respect to the exemplary scenario described in the Overview section of the present document, expediated retrieval data for the first content data item may be generated based on whether the second content data item has been processed and based on whether the third content data item has been processed.

The term "match status" describes a data entity that is generated by a data server computing device based on the unprocessed write request ledger for the data server computing device. The match status describes whether the unprocessed write request ledger includes at least one unprocessed sequence number for an unprocessed write request that is associated with a corresponding data object identifier. In some embodiments, the match status embodies a determination that the unprocessed write request ledger includes at least one unprocessed sequence number that is associated with an unprocessed write request for the data object identifier. Accordingly, if the unprocessed write request ledger includes at least one unprocessed sequence number for the data object identifier, the match status for the data object identifier describes an affirmative match status, which indicates that at least one write request associated with the data object identifier remains unprocessed at the time of processing the read request associated with the write request. Moreover, if the processed write request ledger includes no unprocessed sequence numbers for the data object identifier, the match status for the data object identifier describes a negative match status, which indicates that no write request associated with the data object identifier remains unprocessed at the time of processing the read request associated with the write request.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
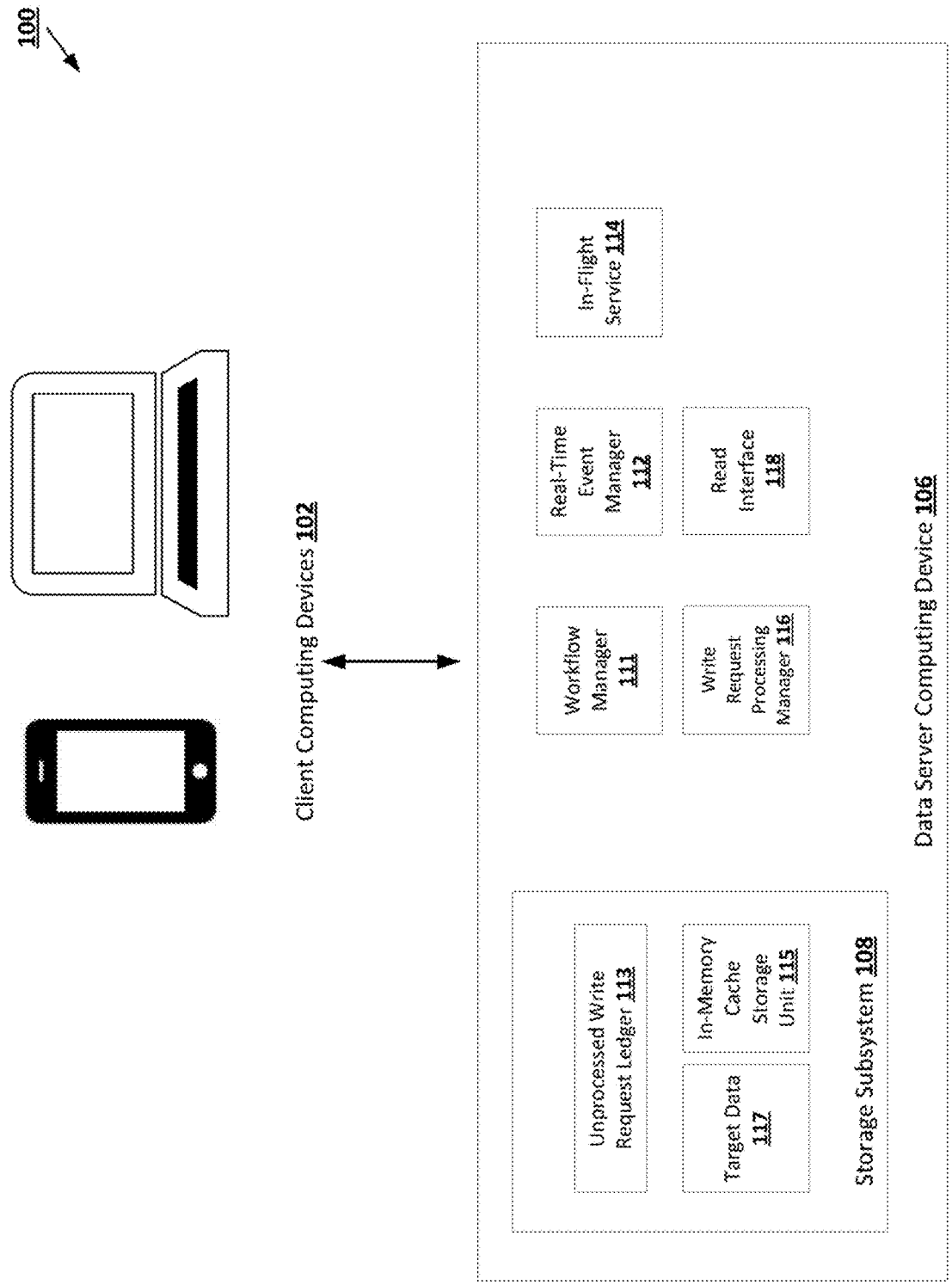
FIG. 1 is a block diagram of an example architecture within which at least some embodiments of the present invention may operate.

FIG. 1 depicts an exemplary architecture 100 for performing asynchronous write request management along with partially decoupled read request management. The architecture 100 includes one or more client computing devices 102 and a data server computing device 106. The client computing devices 102 may be configured to transmit read requests and write requests to the data server computing device 106, and the data server computing device 106 may be configured to process the read requests and the write requests and return output data to the client computing devices 102 in response to the read requests.

The client computing devices 102 and the data server computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

The depicted data server computing device 106 includes a workflow manager 111, a real-time event manager 112, an in-flight service 114, a write request processing manager 116, and a read interface 118. The data server computing device 106 may also be configured to store, on the storage subsystem 108 of the data server computing device 106, an unprocessed write request ledger 113 and target data 117 for data object identifiers. Furthermore, the storage subsystem 108 may include an in-memory cache storage unit 115. The storage subsystem 108 of the data server computing device 106 may include one or more storage units, where each storage unit may store at least one of one or more data assets and/or one or more data about the computed properties of one or more data assets. Moreover, each storage unit may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The depicted workflow manager 111 is configured to manage higher-level workflows that cause the data server computing device 106 to perform asynchronous write request management along with partially decoupled read request management. For example, the workflow manager 111 may trigger write request processing operations by communicating with the real-time event manager, which in turn may cause the real-time event manager to communicate with the write request processing manager 116 to cause the write request processing manager 116 to process unprocessed write requests. As another example, the workflow manager 1111 may generate unprocessed sequence numbers for incoming write requests and store the unprocessed sequence numbers as part of the unprocessed write request ledger 113. As yet another example, the workflow manager 111 may generate update data objects based on read requests and based on the expedited retrieval data stored in the in-memory cache storage unit 115 of the storage subsystem 108.

The real-time event manager 112 may be configured to facilitate expedited processing of write requests by transmitting real-time processing requests to the write request processing manager 116 and the in-flight service 114. For example, the real-time event manager 112 may cause the write request processing manager 116 to process a write request by transmitting a corresponding message to the write request processing manager 116. As another example, the real-time event manager 112 may cause the in-flight service 114 to retrieve target data 117 and update the expedited retrieval data that is stored on the in-memory cache storage unit 115 based on the retrieved target data 117. In some embodiments, the real-time event manager 112 is an Apache Kafka engine. Relatedly, the in-flight service 114 may be configured to update expedited retrieval data based on a latest state of the target data 117 that is stored on the storage subsystem 108, while the write request processing manager 116 may be configured to process a write request by storing the write request data associated with the write request as part of the target data 117 for the data object identifier that is associated with the write request. In some embodiments, the write request processing manager 116 is further configured to, subsequent to processing a write request, remove the unprocessed sequence number for the write request from the unprocessed write request ledger 113.

The read interface 118 may be configured to provide an interface for processing of read requests that are received from the client computing devices 102. For example, the read interface 118 may be configured to receive read requests, provide the read requests to the workflow manager 111, obtain update data objects for read requests from the workflow manager 111, and provide the update data objects to the client computing devices 102 in response to the received read requests. In some embodiments, the read interface 118 is a graph-based database interface, such as a GraphQL interface.

The unprocessed write request ledger 113 and the target data 117 that are stored as part of the storage subsystem 108 are discussed in greater detail throughout the data. As alluded to above, the storage subsystem 108 also stores expedited retrieval data on the in-memory cache storage unit 115. The in-memory cache storage unit 115 is a fast storage medium that can facilitate expedited retrieval of the noted expedited retrieval data.

Exemplary Data Server Computing Device

Figure 2:
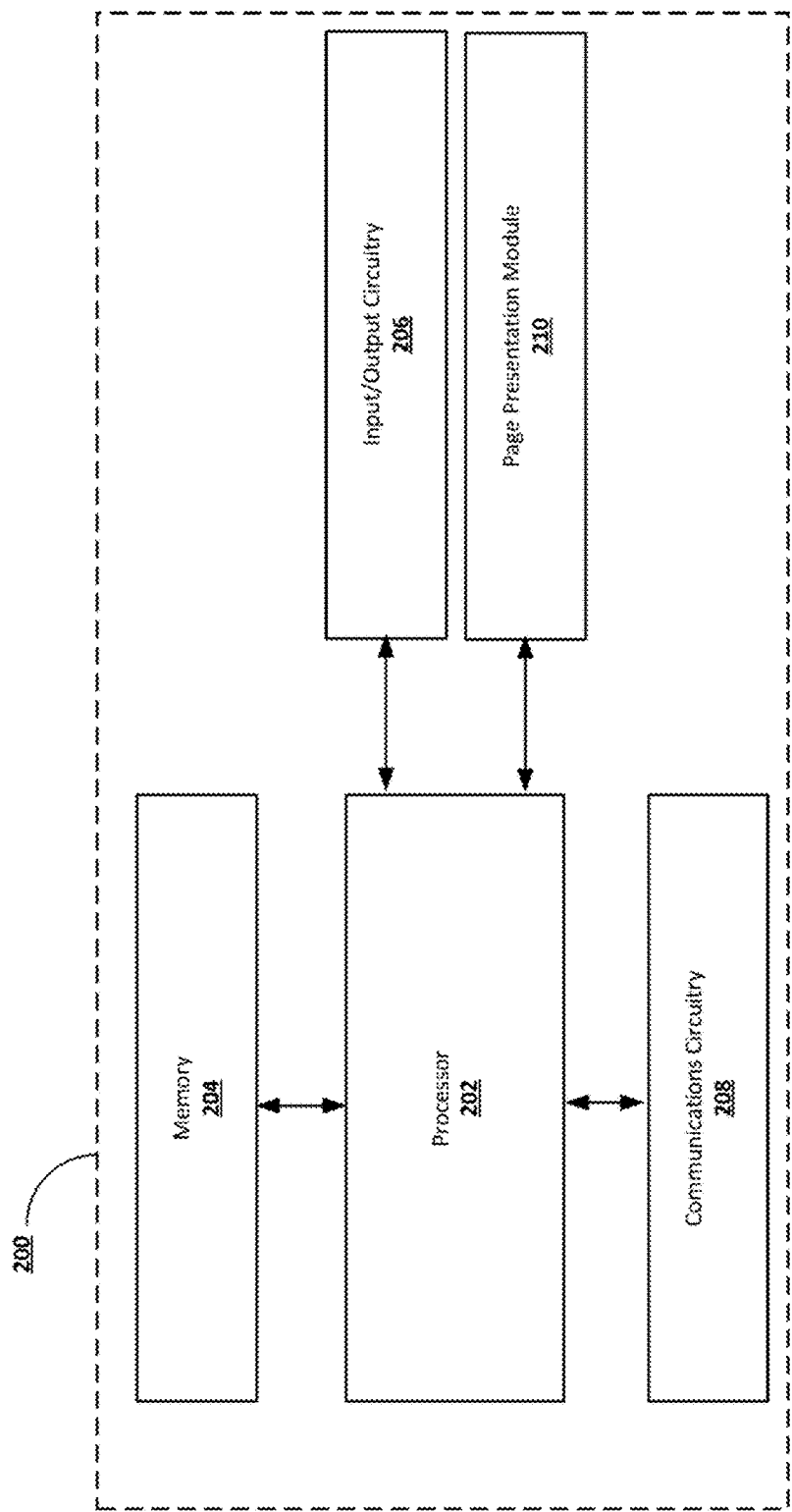
FIG. 2 is a block diagram of an example data server computing device in accordance with at least some embodiments of the present invention.

The data server computing device 106 may be embodied by one or more computing systems, such as apparatus 200 shown in FIG. 2. The apparatus 200 may include processor 202, memory 204, input/output circuitry 206, communications circuitry 208, and a page presentation module 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The page presentation module 210 may be any means such as a device or circuitry embodied in either hardware or a combination of hardware and software that is configured to present user interface data associated with a page that is associated with a read request to a requesting computing device. In some embodiments, the page presentation module 210 may be configured to process read requests in accordance with techniques disclosed herein for partially decoupled processing of read requests.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
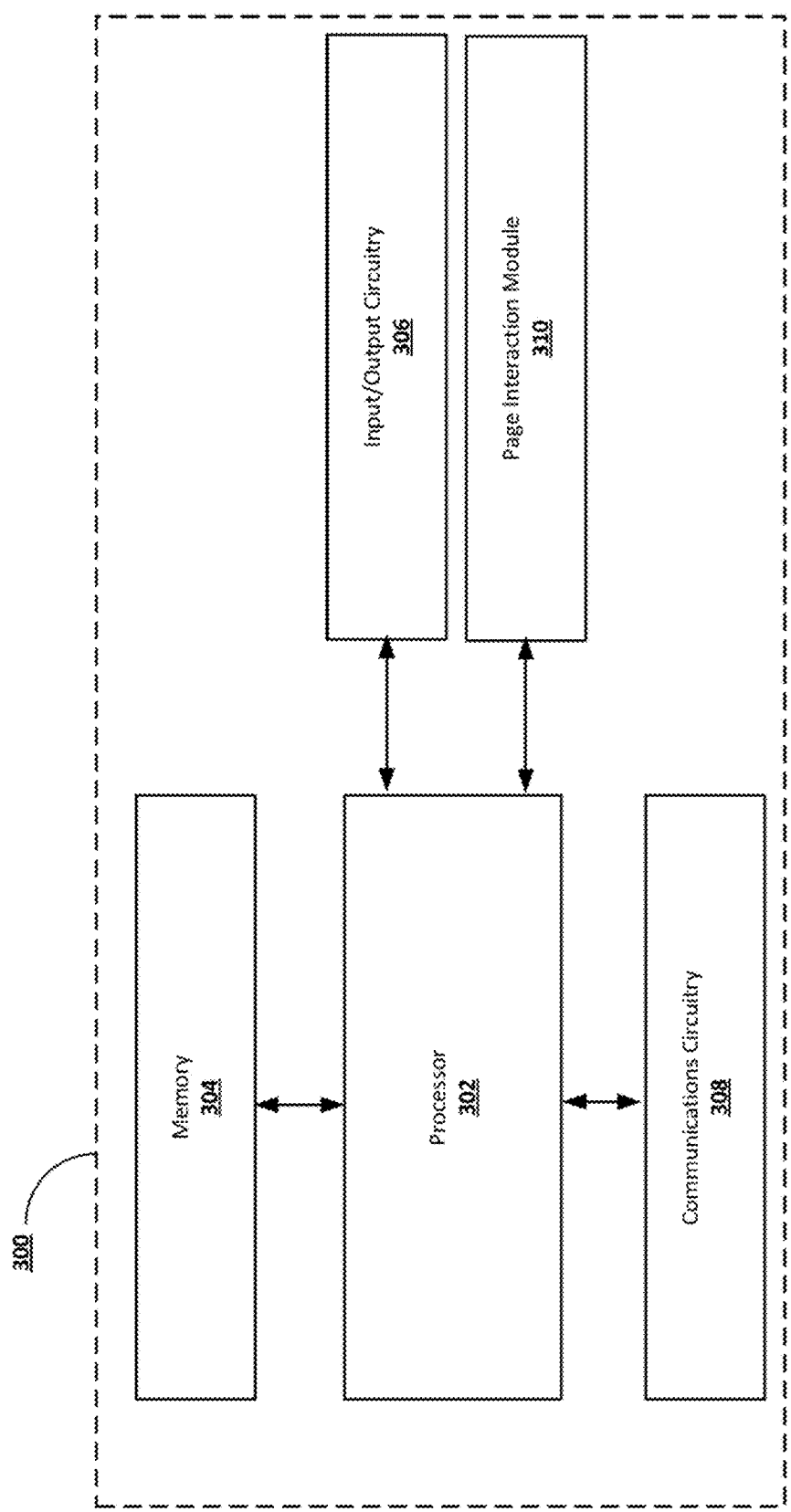
FIG. 3 is a block diagram of an example client computing device in accordance with at least some embodiments of the present invention.

Referring now to FIG. 3, a client computing device (e.g., a client computing device that is a limited interaction device or a client computing device that is a non-limited interaction device) may be embodied by one or more computing systems, such as apparatus 300 shown in FIG. 3. The apparatus 300 may include processor 302, memory 304, input/output circuitry 306, communications circuitry 308, and a page interaction module 310. Although these components 302-310 are described with respect to functional limitations, it should be understood that the particular implementations necessarily include the use of particular hardware. It should also be understood that certain of these components 302-310 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The page interaction module 310 may be any means such as a device or circuitry embodied in either hardware or a combination of hardware and software that is configured to receive an update data object for a page and present the update data object using a user interface that is configured to display content data associated with the page. For example, the page interaction module 310 may be configured to display the user interface using a native user interface rendering engine and/or using a web-based user interface rendering engine, such as a web-based user interface engine that is configured to display user interfaces using a web browser.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Provided below are techniques for performing asynchronous write request management along with partial decoupling of read request management from write request management. By using the below-described techniques, the data server computing device 106 can reduce read request processing latency without tolerating extreme data reliability risks imposed by a total decoupling of read request processing procedures and write request processing procedures. However, while various embodiments of the present invention describe the asynchronous write request management concepts and the partially decoupled read request management concepts of the present invention as being implemented collectively, a person of ordinary skill in the relevant technology will recognize that each of the asynchronous write request management concepts and the partially decoupled read request management concepts can be implemented without implementing the other.

The below-described techniques can address technical problems associated with managing read and write requests in an environment that enables multiple users to collaboratively and substantially simultaneously both read and write data accessed by a data server computing device. To address the challenges concerning processing of temporally proximate write requests and read requests, various embodiments of the present invention disclose and implement two related concepts: asynchronous write request management and partially decoupled read request management. For example, in various embodiments of the present invention, while processing a read request takes into account whether a corresponding data object is associated with unprocessed write requests prior to generating output data corresponding to the read request, this consideration is limited in duration in order to reduce read request processing latency. By using the described techniques, the noted embodiments of the present invention can reduce read request processing latency without introducing data reliability risks imposed by a total decoupling of read request processing procedures and write request processing procedures.

Asynchronous Write Request Management

Figure 4:
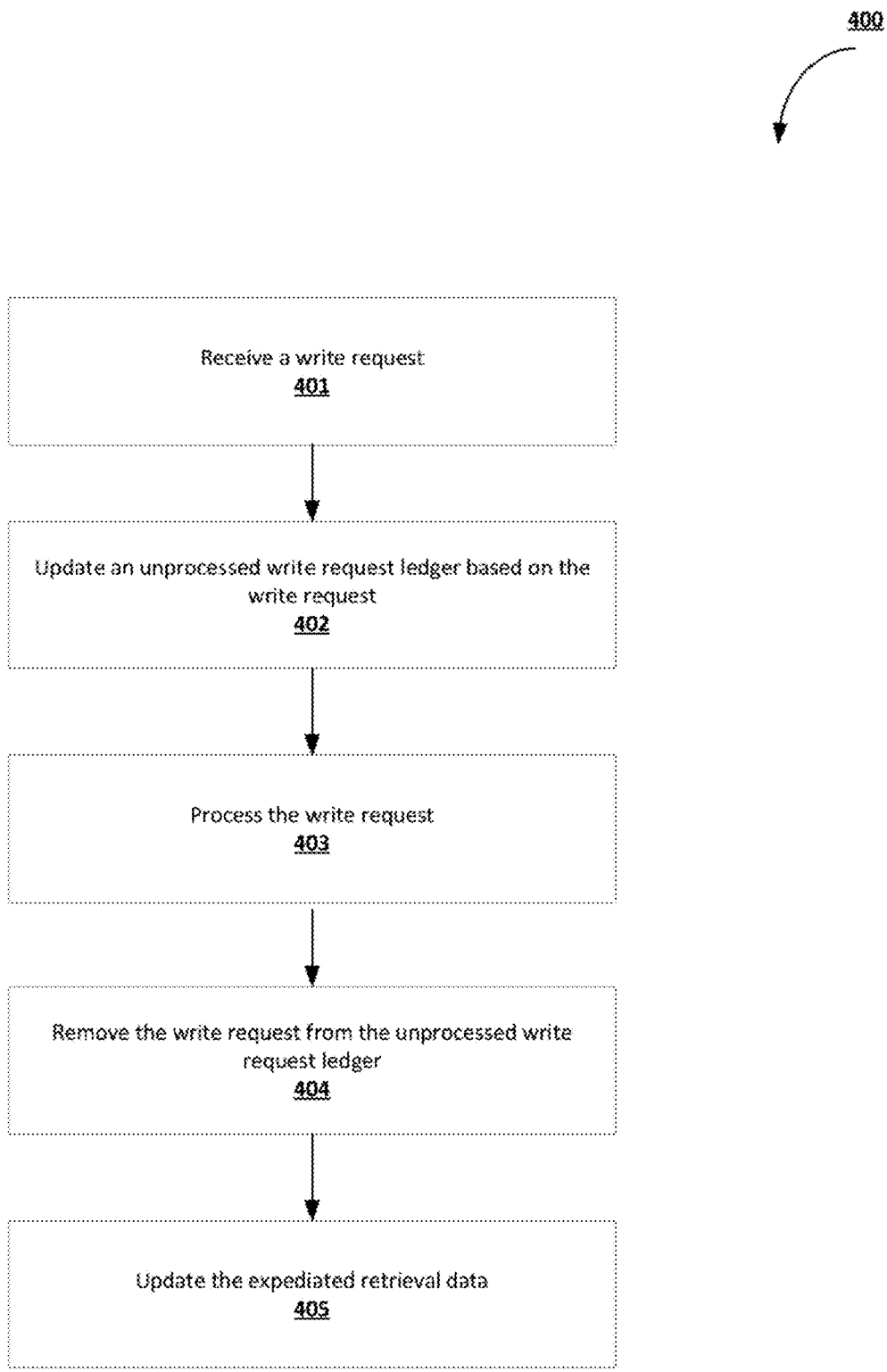
FIG. 4 is a flowchart diagram of an example process for processing a write request in accordance with at least some embodiments of the present invention.

FIG. 4 is a flowchart diagram of an example process 400 for asynchronously processing a write request. Via the various operations of the process 400, the data server computing device 106 can process write requests for a data object identifier through a procedure that is partially decoupled from the procedure for processing read requests for the data object identifier, a technique that in turn can reduce read request processing latency without tolerating the data reliability risks imposed by a total decoupling of read request processing procedures and write request processing procedures.

The process 400 begins at operation 401 when the data server computing device 106 receives the write request for the data object identifier from a client computing device 102. As discussed above, a write request may describe a request by the client computing device 102 to append write request data associated with the write request to target data associated with the corresponding data object identifier. In some embodiments, the write request is configured to trigger operations by the data server computing device 106 to persistently store the write request data as part of the target data for the data object identifier. Examples of write requests include requests to add content to a page object identifier, requests to add annotations to a page object identifier, requests to add comments to a page object identifier, etc. In some embodiments, a write request is generated by a client computing device 102 and subsequently transmitted to a data server computing device 106 in response to an end-user request by an end-user of the client computing device to modify a page data object being hosted on a storage subsystem associated with the data server computing device 106.

An operational example of performing the operation 401 is depicted in FIG. 6A. As depicted in FIG. 6A, to perform the operation 401 in order to receive the write request for the data object identifier from the client computing device A 102A, the workflow manager 111 of the data server computing device 106 performs operation 611 that is configured to receive the write request from the client computing device A 102A. With respect to the exemplary scenario described in the Overview section of the present document, at operation 611, the workflow manager 111 may receive two write requests: a first write request that is generated based on Jane's actions and a second write request that is generated based on Fred's actions. For example, the workflow manager 111 of a data server computing device 106 that is associated with a collaborative page management system (e.g., the Confluence® system) may receive a write request for a page object identifier that describes addition of one or more content data items (e.g., one or more comment data items, one or more page data items, one or more document data items, and/or the like) to the page object identifier. As further depicted in FIG. 6A, in some embodiments, subsequent to receiving the write request from the client computing device A 102A at operation 611, the workflow manager 111 proceeds to operation 612, which is configured to transmit data describing the write request to the real-time event manager 112 of the data server computing device 106. With respect to the exemplary scenario described in the Overview section of the present document, at operation 612, the workflow manager 111 may transmit data describing each write request to the real-time event manager 112. For example, in embodiments in which the real-time event manager 112 is an Apache Kafka engine, the workflow manager 111 may perform operation 612 by pushing one or more Kafka messages corresponding to events defined based on the received write request to the Apache Kafka engine.

Returning to FIG. 4, at operation 402, the data server computing device 106 updates an unprocessed write request ledger for the data object identifier based on the write request. As discussed above, the unprocessed write request ledger may describe each unprocessed sequence number for an unprocessed write request that is associated with the data object identifier, for example as part of a component of the unprocessed write request ledger that includes all of the unprocessed write requests for the particular data object identifier. The unprocessed write request ledger may, for example, be a queue data object that is updated in a first-in-first-out manner. An example of an unprocessed write request ledger is a data entity that identifies all incoming comments for a page object identifier whose corresponding comment data (e.g., whose corresponding comment content data and/or corresponding comment metadata) have not been persistently stored as part of the page data for the page object identifier.

An operational example of performing the operation 402 is depicted in FIG. 6B. As depicted in FIG. 6B, to perform the operation 402 in order to update an unprocessed write request ledger for the data object identifier to include the write request, the workflow manager 111 of the data server computing device 106 performs operation 613, which is configured to generate an unprocessed sequence number for the write request and update the unprocessed write request ledger by adding the unprocessed sequence number for the write request. With respect to the exemplary scenario described in the Overview section of the present document, at operation 613, the workflow manager 111 generates two unprocessed sequence numbers: one unprocessed sequence number for the write request associated with Jane's actions and another unprocessed sequence number for the write request associated with Fred's actions. For example, in some embodiments, in order to perform the operation 613, the workflow manager 111 adds the write sequence number for the write request that is associated with the data object identifier to a queue of the unprocessed write request ledger that is associated with the data object identifier. As another example, in some embodiments, in order to perform the operation 613, the workflow manager 111 adds the write sequence number for the write request that is associated with the data object identifier to a queue of the unprocessed write request ledger that is associated with the data object identifier.

Returning to FIG. 4, at operation 403, the data server computing device 106 processes the write request. As discussed above, to process the write request, the data server computing device 106 stores write request data associated with the unprocessed write request (e.g., write request content data associated with the write request and/or write request metadata associated with the write request) as part of the target data associated with a corresponding data object identifier. Accordingly, in some embodiments, when the data server computing device 106 first receives a write request from the client computing device 102, the write request is deemed unprocessed until the data server computing device 106 persistently stores the write request data associated with the write request as part of the target data for the corresponding data object identifier, after which the write request is deemed processed.

An operational example of performing the operation 403 is depicted in FIG. 6C. As depicted in FIG. 6C, to perform the operation 403 in order to process the write request, the real-time event manager 112 of the data server computing device 106 performs operation 614, which is configured to transmit a request to the write request processing manager 116 of the data server computing device 106 to process the write request by storing write request data associated with the write request as part of the target data 117 stored on the storage subsystem 108. With respect to the exemplary scenario described in the Overview section of the present document, at operation 614, the real-time event manager 112 transmits two requests: a first request to the write request processing manager 116 to process the write request associated with Jane's actions and a second request to the write request processing manager 116 to process the write request associated with Fred's actions. For example, when the real-time event manager 112 is an Apache Kafka engine, the Apache Kafka engine generates a Kafka event that is configured to cause the write request processing manager 116 to process the write request by storing write request data associated with the write request as part of the target data 117 stored on the storage subsystem 108, and subsequently transmits the generated Kafka event to the write request processing manager 116. As further depicted in FIG. 6, to perform the operation 403 in order to process the write request, subsequent to performing operation 614 in order to transmit a request to the write request processing manager 116 to process the write request, the write request processing manager 116 proceeds to operation 615 by processing the write request by storing write request data associated with the write request as part of the target data 117 stored on the storage subsystem 108. With respect to the exemplary scenario described in the Overview section of the present document, at operation 615, the write request processing manager 116 may sequentially store the data associated with the two write requests generated in that exemplary scenario as part of the target data for the first content data item. For example, the write request processing manager 116 may store the write request content data associated with the write request as part of the target content data portion of the target data 117 and store the write request metadata associated with the write request as part of the target metadata portion of the target data 117.

Returning to FIG. 4, at operation 404, the data server computing device 106 removes the write request from the unprocessed write request ledger. In some embodiments, subsequent to processing the write request by persistently storing the write request data associated with the write request as part of the target data for the data object identifier, the write request is deemed processed, and thus the data server computing device 106 proceeds to remove the now-processed write request from the unprocessed write request ledger. In some embodiments, to remove the write request from the unprocessed write request ledger, the data server computing device 106 removes the write request from the portion of the write request ledger that corresponds to the data object identifier.

An operational example of performing the operation 404 is depicted in FIG. 6D. As depicted in FIG. 6D, to perform the operation 404 in order to remove the write request from the unprocessed write request ledger, the write request processing manager 116 of the data server computing device 106 performs operation 616, which is configured to transmit a request to the unprocessed write request ledger 113 to remove the write request from the unprocessed write request ledger. With respect to the exemplary scenario described in the Overview section of the present document, at operation 616, after processing each write request by persistently storing the write request data associated with that write request in the target data for the first content data item, the write request processing manager 116 proceeds to remove the unprocessed sequence number for the processed write request from the portion of the unprocessed write request ledger that is associated with the first content data item. In some embodiments, to perform operation 615, the write request processing manager 116 removes the unprocessed sequence number associated with the write request from a portion of the write request ledger that corresponds to the data object identifier, for example, from a queue of unprocessed sequence numbers associated with the data object identifier that is stored as part of the unprocessed write request ledger.

Returning to FIG. 4, at operation 405, the data server computing device 106 updates the expedited retrieval data based on the updated target data. In some embodiments, subsequent to updating the target data by persistently storing the write request content data associated with the write request as part of the target data at operation 403, the data server computing device 106 proceeds to move the updated target data to a cache storage medium by updating expedited retrieval data stored on the cache storage medium based on the updated target data. As discussed above, expedited retrieval data is stored as part of an in-memory cache storage unit for the data server computing device 106 in order to facilitate expedited data retrieval of data associated with the corresponding data object identifier when responding to a read request associated with the corresponding data object identifier. In some embodiments, expedited retrieval data is used to generate an update data object for the corresponding data object identifier in response to the read requests associated with the corresponding data object identifier. In some embodiments, the expedited retrieval data are graph-based data, such as data describing comments to a corresponding page object identifier as graph-based relationships (e.g., edges) of a central node associated with the corresponding page object identifier. In some of the noted embodiments, the read request associated with the corresponding page object identifier is a graph-based query, such as a GraphQL query.

An operational example of performing the operation 405 is depicted in FIG. 6E. As depicted in FIG. 6E, to perform the operation 405 to update the expedited retrieval data based on the updated target data, the real-time event manager 112 of the data server computing device 106 performs operation 617, which is configured to transmit a request to the in-flight service 114 of the data server computing device 106 to update the expedited retrieval data stored on the in-memory cache storage unit 115 based on the target data 117 as updated in accordance with the operation 615. With respect to the exemplary scenario described in the Overview section of the present document, at operation 617, the real-time event manager transmits a request to the in-flight service 114 to update the expedited retrieval data after successful processing of each of the two write requests generated in that exemplary scenario. For example, if the real-time event manager 112 is an Apache Kafka engine, the noted Apache Kafka engine generates a Kafka event that causes the in-flight service 114 to store updates to the target data 117 as part of the expedited retrieval data stored on the in-memory cache storage unit 115. As further depicted in FIG. 6E, to perform the operation 405 to update the expediated retrieval data based on the updated target data, in response to receiving the request to update the expedited retrieval data stored on the in-memory cache storage unit 115 based on the target data 117 as updated, the in-flight service 114 proceeds to perform the operation 618, which is configured to update the expedited retrieval data by doing at least one of: (i) making changes to the expedited retrieval data based on the updates to the target data 117, or (ii) replacing the existing expedited retrieval data based on the target data 117 as updated. With respect to the exemplary scenario described in the Overview section of the present document, at operation 618, the in-flight service 114 updates the expedited retrieval based on the updated status of the target data for the first content data item subsequent to integration of each write request data for a write request of the two write requests generated in that exemplary scenario with the target data.

Partially Decoupled Read Request Management

Figure 5:
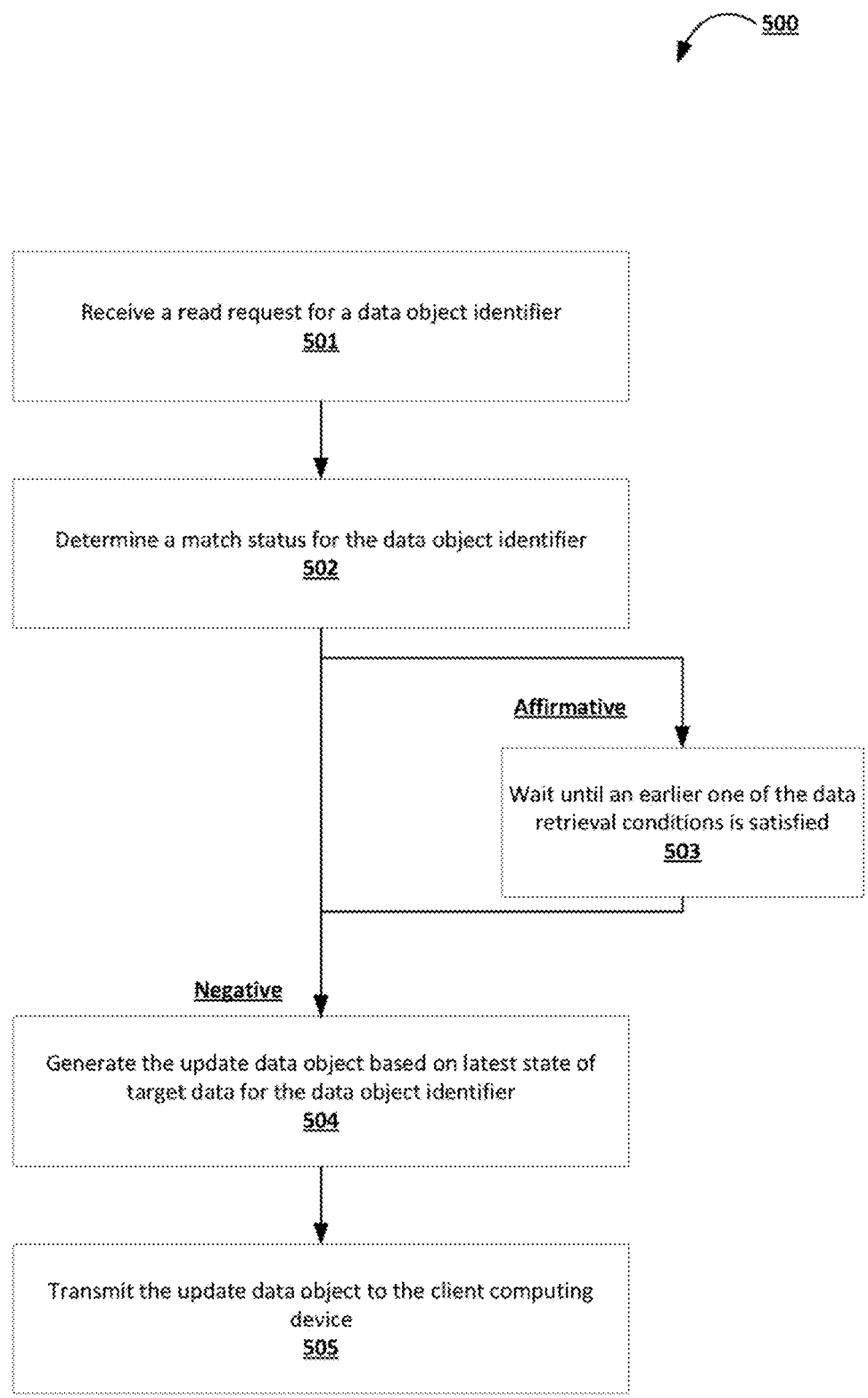
FIG. 5 is a flowchart diagram of an example process for processing a read request in accordance with at least some embodiments of the present invention.

FIG. 5 is a flowchart diagram of an example process 500 for asynchronously processing a read request. Via the various operations of the process 500, the data server computing device 106 can process read requests for a data object identifier through a procedure that is partially decoupled from the procedure for processing write requests for the data object identifier, a technique that in turn can reduce read request processing latency without tolerating the data reliability risks imposed by a total decoupling of read request processing procedures and write request processing procedures.

The process 500 begins at operation 501 when the data server computing device 106 receives a read request for a data object identifier from a client computing device 102. As discussed above, the read request may describe a request by a client computing device 102 to retrieve an update data object which is configured to describe a latest state of target data associated with the data object identifier. In some embodiments, the read request is configured to trigger operations by the data server computing device 106 to generate the update data object and transmit the update data object to the client computing device 102. Examples of read requests include requests generated when a user profile requests to open a user interface that is configured to display target data associated with a data object identifier, requests generated when a user profile requests to refresh an already-opened user interface that is configured to display target data associated with a data object identifier, and requests generated when a client computing device seeks to automatically (e.g., periodically) refresh an already-opened user interface that is configured to display target data associated with a data object identifier. In some embodiments, the read request is generated by a client computing device 102 and subsequently transmitted to the data server computing device 106 in response to an end-user request by an end-user of the client computing device 102 to refresh a page data object being hosted on a storage subsystem associated with the data server computing device 106.

An operational example of performing the operation 501 is depicted in FIG. 6F. As depicted in FIG. 6F, to perform the operation 501 in order to receive the read request associated with the data object identifier, the read interface 118 of the data server computing device 106 performs the operation 619, which is configured to receive the read request from the client computing device A 102A. With respect to the exemplary scenario described in the Overview section of the present document, at operation 619, the read interface 118 receives a write request that is generated based on Sally's actions. In some embodiments in which the read interface is a GraphQL query processing engine, the GraphQL processing engine receives the read requests as GrapQL queries, e.g., as GraphQL queries transmitted to an application programming interface (API) of the GraphQL processing engine.

Returning to FIG. 5, at operation 502, the data server computing device 106 determines a match status for the data object identifier based on the unprocessed write request ledger. As described above, the match status may be configured to describe a determination about whether the unprocessed write request ledger includes at least one unprocessed sequence number that is associated with an unprocessed write request for the data object identifier. Accordingly, if the unprocessed write request ledger includes at least one unprocessed sequence number for the data object identifier, the match status for the data object identifier describes an affirmative match status, which indicates that at least one write request associated with the data object identifier remains unprocessed at the time of processing the read request associated with the write request. Moreover, if the processed write request ledger includes no unprocessed sequence numbers for the data object identifier, the match status for the data object identifier describes a negative match status, which indicates that no write request associated with the data object identifier remains unprocessed at the time of processing the read request associated with the write request.

An operational example of performing the operation 502 is depicted in FIG. 6G. As depicted in FIG. 6G, to perform the operation 502 to determine the match status for the data object identifier, the read interface 118 of the data server computing device 106 performs the operation 620, which is configured to retrieve information about whether the unprocessed write request ledger 113 includes at least one unprocessed sequence number that is associated with the data object identifier which is subject to the read request. With respect to the exemplary scenario described in the Overview section of the present document, at operation 620, the read interface 118 retrieves the portion of the unprocessed write request ledger 113 that is associated with the first content data item and analyzes the portion to determine whether the first content data item is associated with at least one unprocessed write request. In some embodiments, to perform the operation 621, the read interface 118 transmits a request to obtain the information about whether the unprocessed write request ledger 113 includes at least one unprocessed sequence number that is associated with the data object identifier to the storage subsystem 108, and the storage subsystem 108 generates the information based on the then-existing state of the unprocessed write request ledger 113 and transmits the information to the read interface 118. As further depicted in FIG. 6G, to perform the operation 502 to determine the match status for the data object identifier, subsequent to retrieving the information about whether the unprocessed write request ledger 113 includes at least one unprocessed sequence number that is associated with the data object identifier, the read interface 118 proceeds to perform the operation 621, which is configured to transmit the write request (e.g., the write request that includes a GraphQL query) to the workflow manager 111. With respect to the exemplary scenario described in the Overview section of the present document, at operation 621, the read interface 118 transmits the read request generated based on Sally's actions to the workflow manager 111.

Returning to FIG. 5, at operation 503, in response to determining that the match status the data server computing device 106 describes an affirmative match status, the data server computing device 106 first proceeds to operation 504, at which the data server computing device 106 waits until an earlier one of the data retrieval conditions is satisfied, and subsequently the data server computing device 106 generates the update data object based on a latest state of target data associated with the data object identifier as soon as one of a plurality of data retrieval conditions is satisfied. Moreover, in response to determining that the match status the data server computing device 106 describes a negative match status, the data server computing device 106 directly proceeds to operation 504, at which the data server computing device 106 generates the update data object based on a latest state of target data.

As discussed above, the data retrieval conditions include a group of conditions, where the configuration data for the data server computing device 106 describes that satisfaction of one of (e.g., an earlier-satisfied one of) the noted conditions is a sufficient prerequisite for generating an update data object for a corresponding data object identifier based on a latest state of target data for the corresponding data object identifier that is available at the time of the satisfaction. For example, in some embodiments, the data retrieval conditions consist of two conditions: a first condition that is satisfied if one or more identified unprocessed write requests for a corresponding data object identifier are marked as processed and a second condition that is satisfied if a waiting period (e.g., a waiting period of 300 milliseconds after receiving a read request for the corresponding data object identifier from a client computing device) expires. Thus, in some embodiments, upon receiving a read request for a corresponding data object identifier that is associated with one or more unprocessed write requests and in response to determining an affirmative match status for the corresponding data object identifier, the data server computing device 106 waits until the earlier of the expiration of a waiting period or processing of the one or more unprocessed write requests before generating the update data object based on the latest state of the target data associated with the corresponding data object identifier.

An operational example of performing the operation 504 is depicted in FIG. 6H. As depicted in FIG. 6H, to perform the operation 504 to determine an update data object, the workflow manager 111 of the data server computing device 106 first performs the operation 622, which is configured to retrieve the expediated retrieval data from the in-memory cache storage unit 115 and use the retrieved expediated retrieval data to generate the update data object, where the expediated retrieval data are configured to describe the latest state of the target data 117 for the corresponding data object identifier. With respect to the exemplary scenario described in the Overview section of the present document, at operation 622, the workflow manager 111 retrieves the expediated retrieval data for the first content data item and uses the noted expediated retrieval data to generate the update data object for the read request generated based on Sally's actions. As further depicted in FIG. 6H, to perform the operation 504 to determine an update data object, subsequent to retrieving the expediated retrieval data describing the latest state of the target data 117 and using the retrieved expediated retrieval data to generate the update data object, the workflow manager 111 transmits the update data object to the read interface 118 of the data server computing device 106 at operation 623. With respect to the exemplary scenario described in the Overview section of the present document, at operation 623, the workflow manager 111 transmits the update data object for the read request associated with Sally's request to the read interface 118.

Returning to FIG. 5, at operation 505, subsequent to determining the update data object (which describes the latest state of the target data for the data object identifier at a desired time, where the desired time is determined based on the techniques described in relation to the operation 502 and 503), the data server computing device 106 proceeds to transmit the update data object to the client computing device 102. For example, as depicted in FIG. 6I (which is an operational example of performing the operation 505 in order to transmit the update data object to the client computing device 102), at operation 624, the read interface 118 of the data server computing device 106 transmits the noted update data object that the read interface 118 has received from the workflow manager 111 of the data server computing device 106 to the client computing device A 102A. With respect to the exemplary scenario described in the Overview section of the present document, at operation 624, the read interface 118 transmits the update data object to a client computing device 102 that is associated with Sally in response to the read request generated based on Sally's actions.

An operational example of performing partially decoupled read request management according to the process 500 of FIG. 5 is depicted in FIGS. 7A-7C. FIGS. 7A-7C depict the states of the unprocessed write request ledger portion 701 for a data object identifier and the expedited retrieval data 702 for the data object identifier at three times: the time associated with FIG. 7A, which is the earliest of the three times and occurs prior to the expiration of the waiting period for the corresponding system; the time associated with FIG. 7B, which occurs after the time associated with the FIG. 7A but prior to the time associated with FIG. 7C and which occurs prior to the expiration of the waiting period for the corresponding system; and the time associated with FIG. 7C which is the latest of the three times and occurs at the time of the expiration of the waiting period for the corresponding.

Accordingly, at the time associated with FIG. 7A, because the unprocessed write request ledger portion 701 for the data object identifier includes two unprocessed sequence numbers, the data object identifier is associated with an affirmative match status. As a result, in some embodiments, the data server computing device 106 waits until an earlier of the following two conditions are satisfied: the waiting period expires or both of the unprocessed sequence numbers are deemed processed and thus included in the expedited retrieval data 702 for the data object identifier. Neither of the two conditions is satisfied at the time associated with FIG. 7B, as at that time the waiting period has not expired and one unprocessed sequence number is still in the unprocessed write request ledger portion 701 and not included in the expedited retrieval data 702. However, the waiting period expiration condition is satisfied at the time associated with FIG. 7C, and thus the update data object may be determined based on the state of the expedited retrieval data 702 at the time associated with FIG. 7C.

Figure 8A:
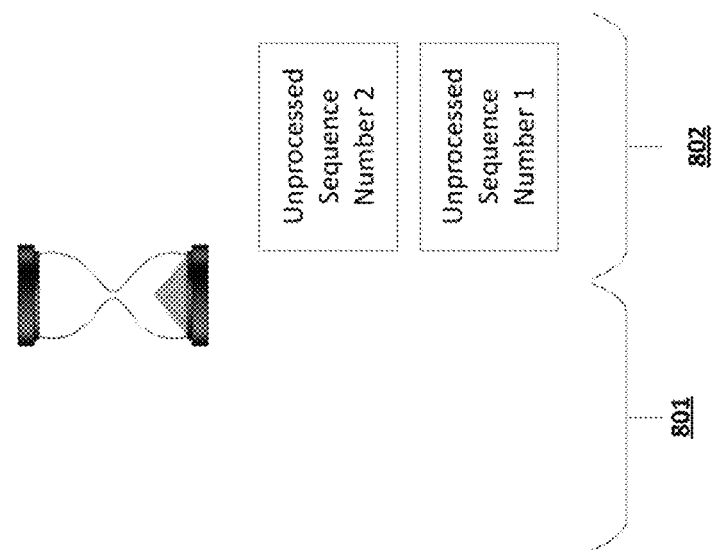
Figure 8B:
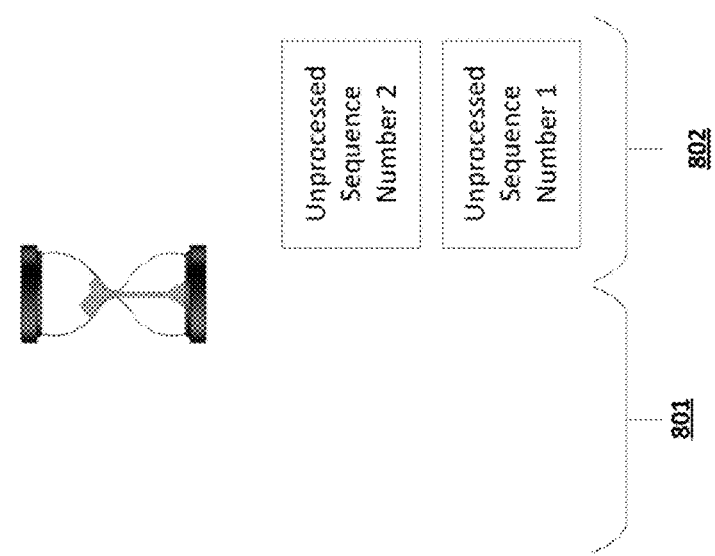
Figure 8C:
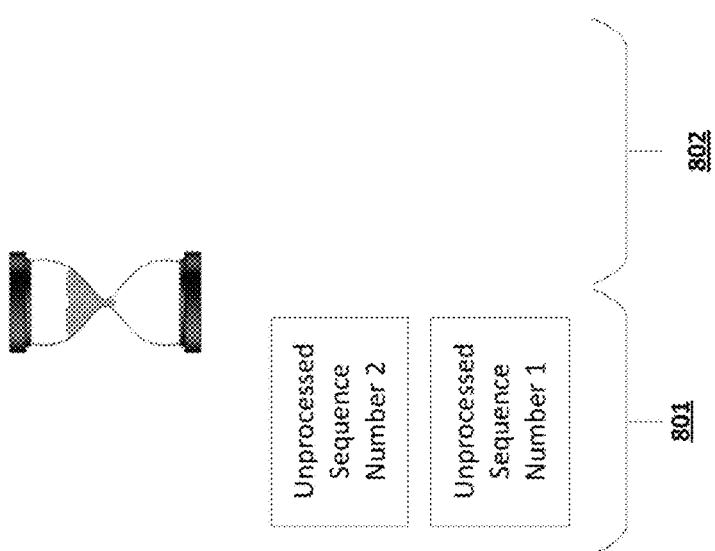

Another operational example of performing partially decoupled read request management according to the process 500 of FIG. 5 is depicted in FIGS. 8A-8C. FIGS. 8A-8C depict the states of the unprocessed write request ledger portion 801 for a data object identifier and the expedited retrieval data 802 for the data object identifier at three times: the time associated with FIG. 8A, which is the earliest of the three times and occurs prior to the expiration of the waiting period for the corresponding system; the time associated with FIG. 8B, which occurs after the time associated with the FIG. 8A but prior to the time associated with FIG. 8C and which occurs prior to the expiration of the waiting period for the corresponding system; and the time associated with FIG. 8C which is the latest of the three times and occurs at the time of the expiration of the waiting period for the corresponding.

Accordingly, at the time associated with FIG. 8A, because the unprocessed write request ledger portion 801 for the data object identifier includes two unprocessed sequence numbers, the data object identifier is associated with an affirmative match status. As a result, in some embodiments, the data server computing device 106 waits until an earlier of the following two conditions are satisfied: the waiting period expires or both of the unprocessed sequence numbers are deemed processed and thus included in the expedited retrieval data 802 for the data object identifier. The latter of the two conditions is satisfied at the time associated with FIG. 8B, as at that time the waiting period has not expired but no unprocessed sequence number for the data object is still in the unprocessed write request ledger portion 801 and not included in the expedited retrieval data 802. Thus, the update data object may be determined based on the state of the expedited retrieval data 802 at the time associated with FIG. 8B, assuming that the time associated with FIG. 8B is the earliest time at which no unprocessed sequence number for the data object is still in the unprocessed write request ledger portion 801 and not included in the expedited retrieval data 802.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for reliable data retrieval given asynchronous write request processing, the apparatus comprising at least one hardware processor and at least one memory including program code, the at least one memory and the program code configured to, with the at least one hardware processor, cause the apparatus to at least:
  receive a read request for a data object identifier from a client computing device;
  in response to receiving the read request, determine a match status for the data object identifier based on an unprocessed write request ledger, wherein the match status describes an affirmative match status when the unprocessed write request ledger comprises one or more unprocessed sequence numbers that describe one or more unprocessed write requests for the data object identifier and describes a negative match status when the unprocessed write request ledger is empty;
  in response to determining that the match status describes the affirmative match status, wait until an earlier-satisfied retrieval condition of a set of data retrieval conditions is satisfied before generating an update data object associated with the data object identifier based on a latest state of target data associated with the data object identifier, wherein the set of data retrieval conditions comprises a first data retrieval condition that is satisfied when all of the one or more unprocessed write requests are marked as processed and a second data retrieval condition that is satisfied when a waiting period is expired; and
  subsequent to generating the update data object, transmit the update data object to the client computing device.

2. The apparatus of claim 1, wherein determining the match status comprises:
  retrieving the unprocessed write request ledger;
  determining whether the unprocessed write request ledger is empty; and
  determining the match status based on whether the unprocessed write request ledger is empty.

3. The apparatus of claim 1, wherein the at least one memory and the program code are further configured to, with the at least one hardware processor, cause the apparatus to at least:
  receive a write request for the data object identifier;
  in response to receiving the write request:
    generate a sequence number for the write request, and
    update the unprocessed write request ledger for the data object identifier by adding the sequence number as one of the one or more unprocessed sequence numbers.

4. The apparatus of claim 3, wherein the at least one memory and the program code are further configured to, with the at least one hardware processor, cause the apparatus to at least:
  in response to updating the unprocessed write request ledger:
    process the write request by persistently storing write request data associated with the write request as part of the target data for the data object identifier, and
    in response to processing the write request, remove the sequence number from the one or more unprocessed sequence numbers stored as part of the unprocessed write request ledger.

5. The apparatus of claim 4, wherein the write request data comprise write request content data and write request metadata.

6. The apparatus of claim 4, wherein the at least one memory and the program code are further configured to, with the at least one hardware processor, cause the apparatus to at least:
  in response to persistently storing write request data associated with the write request as part of the target data for the data object identifier:
    generate expedited retrieval data associated with the data object identifier based on the target data, and
    store the expedited retrieval data on an in-memory cache storage unit.

7. The apparatus of claim 1, wherein:
  the target data comprises a target content data segment a target metadata segment, and
  the target content data segment and the target metadata segment are stored in separate data storage units.

8. The apparatus of claim 1, wherein determining the update data object comprises:
  retrieving expedited retrieval data associated with the data object identifier from an in-memory cache storage unit, wherein the expedited retrieval data is configured to describe the latest state of the target data, and
  determining the update data object based on the expedited retrieval data.

9. The apparatus of claim 8, wherein the expedited retrieval data are stored as a collection of graph-based relationships with a central node associated with the data object identifier.

10. A computer-implemented method for reliable data retrieval given asynchronous write request processing, the computer-implemented method comprising:
  receiving a read request for a data object identifier from a client computing device;

in response to receiving the read request, determining a match status for the data object identifier based on an unprocessed write request ledger, wherein the match status describes an affirmative match status when the unprocessed write request ledger comprises one or more unprocessed sequence numbers that describe one or more unprocessed write requests for the data object identifier and describes a negative match status when the unprocessed write request ledger is empty;

in response to determining that the match status describes the affirmative match status, waiting until an earlier-satisfied retrieval condition of a set of data retrieval conditions is satisfied before generating an update data object associated with the data object identifier based on a latest state of target data associated with the data object identifier, wherein the set of data retrieval conditions comprise a first data retrieval condition that is satisfied when all of the one or more unprocessed write requests are marked as processed and a second data retrieval condition that is satisfied when a waiting period is expired; and subsequent to generating the update data object, transmitting the update data object to the client computing device.

11. The computer-implemented method of claim 10, wherein determining the match status comprises:
retrieving the unprocessed write request ledger;
determining whether the unprocessed write request ledger is empty; and
determining the match status based on whether the unprocessed write request ledger is empty.

12. The computer-implemented method of claim 10, further comprising:
receiving a write request for the data object identifier;
in response to receiving the write request:
generating a sequence number for the write request, and
updating the unprocessed write request ledger for the data object identifier by adding the sequence number as one of the one or more unprocessed sequence numbers.

13. The computer-implemented method of claim 12, further comprising:
in response to updating the unprocessed write request ledger:
processing the write request by persistently storing write request data associated with the write request as part of the target data for the data object identifier, and
in response to processing the write request, removing the sequence number from the one or more unprocessed sequence numbers stored as part of the unprocessed write request ledger.

14. The computer-implemented method of claim 13, wherein the write request data comprise write request content data and write request metadata.

15. The computer-implemented method of claim 13, further comprising:
in response to persistently storing write request data associated with the write request as part of the target data for the data object identifier:
generating expedited retrieval data associated with the data object identifier based on the target data, and
storing the expedited retrieval data on an in-memory cache storage unit.

16. The computer-implemented method of claim 10, wherein:

the target data comprises a target content data segment a target metadata segment, and
the target content data segment and the target metadata segment are stored in separate data storage units.

17. The computer-implemented method of claim 10, wherein determining the update data object comprises:
retrieving expedited retrieval data associated with the data object identifier from an in-memory cache storage unit, wherein the expedited retrieval data is configured to describe the latest state of the target data, and
determining the update data object based on the expedited retrieval data.

18. The computer-implemented method of claim 17, wherein the expedited retrieval data are stored as a collection of graph-based relationships with a central node associated with the data object identifier.

19. A computer program product for reliable data retrieval given asynchronous write request processing, the computer program product comprising at least one non-transitory computer-readable storage medium having computer-readable program code portions stored therein, the computer-readable program code portions configured to:
receive a read request for a data object identifier from a client computing device;
in response to receiving the read request, determine a match status for the data object identifier based on an unprocessed write request ledger, wherein the match status describes an affirmative match status when the unprocessed write request ledger comprises one or more unprocessed sequence numbers that describe one or more unprocessed write requests for the data object identifier and describes a negative match status when the unprocessed write request ledger is empty;
in response to determining that the match status describes the affirmative match status, wait until an earlier-satisfied retrieval condition of a set of data retrieval conditions is satisfied before generating an update data object associated with the data object identifier based on a latest state of target data associated with the data object identifier, wherein the set of data retrieval conditions comprises a first data retrieval condition that is satisfied when all of the one or more unprocessed write requests are marked as processed and a second data retrieval condition that is satisfied when a waiting period is expired; and
subsequent to generating the update data object, transmit the update data object to the client computing device.

20. The computer program product of claim 19, wherein determining the update data object comprises:
retrieving expedited retrieval data associated with the data object identifier from an in-memory cache storage unit, wherein the expedited retrieval data is configured to describe the latest state of the target data, and
determining the update data object based on the expedited retrieval data.

21. An apparatus for asynchronous write request processing, the apparatus comprising at least one hardware processor and at least one memory including program code, the at least one memory and the program code configured to, with the at least one hardware processor, cause the apparatus to at least:
receive a write request for a data object identifier; and
in response to receiving the write request:
generate a sequence number for the write request,
update an unprocessed write request ledger for the data object identifier by adding the sequence number to the unprocessed write request ledger, process the write request by persistently storing write request data associated with the write request as part of target data for the data object identifier, and in response to processing the write request:
remove the sequence number from the unprocessed write request ledger, and
determine a match status that describes an affirmative match status when the unprocessed write request ledger comprises one or more unprocessed sequence numbers corresponding to one or more unprocessed write requests for the data object identifier and describes a negative match status when the unprocessed write request ledger is empty.

22. The apparatus of claim 21, wherein the write request data comprise write request content data and write request metadata.

23. The apparatus of claim 21, wherein the at least one memory and the program code are further configured to, with the at least one hardware processor, cause the apparatus to at least:
in response to persistently storing write request data associated with the write request as part of the target data for the data object identifier:
generate expediated retrieval data associated with the data object identifier based on the target data, and
store the expediated retrieval data on an in-memory cache storage unit.

24. The apparatus of claim 23, wherein the at least one memory and the program code are further configured to, with the at least one hardware processor, cause the apparatus to at least:
receive a read request for the data object identifier from a client computing device;
in response to determining that the status indicator describes that the unprocessed write request ledger comprises at least one unprocessed sequence number for the data object identifier, wait until an earlier-satisfied retrieval condition of a set of data retrieval conditions is satisfied before generating an update data object associated with the data object identifier based on a latest state of the target data associated with the data object identifier, wherein the set of data retrieval conditions comprises a first data retrieval condition that is satisfied when all of the one or more unprocessed write requests are marked as processed and a second data retrieval condition that is satisfied when a waiting period is expired; and
transmit the update data object to the client computing device.

* * * * *